(12) United States Patent
Lednev

(10) Patent No.: US 10,801,964 B2
(45) Date of Patent: Oct. 13, 2020

(54) SPECTROSCOPIC METHODS FOR BODY FLUID AGE DETERMINATION

(71) Applicant: THE RESEARCH FOUNDATION FOR THE STATE UNIVERSITY OF NEW YORK, Albany, NY (US)

(72) Inventor: Igor K. Lednev, Glenmont, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 189 days.

(21) Appl. No.: 15/748,793

(22) PCT Filed: Jul. 29, 2016

(86) PCT No.: PCT/US2016/044837
§ 371 (c)(1),
(2) Date: Jan. 30, 2018

(87) PCT Pub. No.: WO2017/020000
PCT Pub. Date: Feb. 2, 2017

(65) Prior Publication Data
US 2019/0285550 A1 Sep. 19, 2019

Related U.S. Application Data

(60) Provisional application No. 62/199,063, filed on Jul. 30, 2015.

(51) Int. Cl.
*G01N 21/65* (2006.01)
*G01J 3/44* (2006.01)
(Continued)

(52) U.S. Cl.
CPC .............. *G01N 21/658* (2013.01); *G01J 3/28* (2013.01); *G01J 3/44* (2013.01); *G01N 21/3563* (2013.01);
(Continued)

(58) Field of Classification Search
CPC .. G01N 21/65; G01N 21/658; G01N 21/3563; G01N 2021/3595;
(Continued)

(56) References Cited

U.S. PATENT DOCUMENTS

| 2002/0145425 | A1* | 10/2002 | Ebbels | ............... | G01R 33/4625 |
| | | | | | 324/309 |
| 2011/0112385 | A1* | 5/2011 | Aalders | ................ | A61B 5/0059 |
| | | | | | 600/322 |

(Continued)

OTHER PUBLICATIONS

International Preliminary Report on Patentability for corresponding International Patent Application No. PCT/US2016/044837 (dated Feb. 8, 2018).

(Continued)

*Primary Examiner* — Dominic J Bologna
(74) *Attorney, Agent, or Firm* — Garrett Smith

(57) ABSTRACT

The present invention relates to a method of determining the age of a body fluid stain in a sample. This method involves providing the sample containing a body fluid stain; providing a statistical model for determination of the age of the body fluid stain in the sample; subjecting the sample or an area of the sample containing the stain to a spectroscopic analysis to produce a spectroscopic signature for the sample; and applying the spectroscopic signature for the sample to the statistical model to ascertain the age of the body fluid stain in the sample. A method of establishing a statistical model for determination of the age of a body fluid stain in a sample is also disclosed.

20 Claims, 26 Drawing Sheets

(51) Int. Cl.
　　　*G01N 21/3563*　　(2014.01)
　　　*G01J 3/28*　　(2006.01)
　　　*G01N 21/35*　　(2014.01)
(52) U.S. Cl.
　　　CPC ..... *G01N 21/65* (2013.01); *G01N 2021/3595* (2013.01); *G01N 2021/653* (2013.01); *G01N 2201/1296* (2013.01)
(58) Field of Classification Search
　　　CPC ...... G01N 2021/653; G01N 2201/1296; G01J 3/28; G01J 3/44
　　　See application file for complete search history.

(56) References Cited

U.S. PATENT DOCUMENTS

| | | |
|---|---|---|
| 2011/0143961 A1 | 6/2011 | Lednev et al. |
| 2013/0196443 A1* | 8/2013 | Aalders ................. G01J 3/0218 436/66 |
| 2015/0204833 A1* | 7/2015 | O'Brien .................... G01J 3/26 250/339.01 |

OTHER PUBLICATIONS

Sikirzhytskaya, Aliaksandra, "Raman Spectroscopy for the Identification of Body Fluid Traces: Mixtures and Contaminations, Race and Gender Differentiation," A Dissertation Submitted to the University at Albany, State University of New York 1-202 (2014).
PCT International Search Report and Written Opinion corresponding to PCT/US2016/044837, dated Oct. 18, 2016.

\* cited by examiner

FIGs. 1A-B

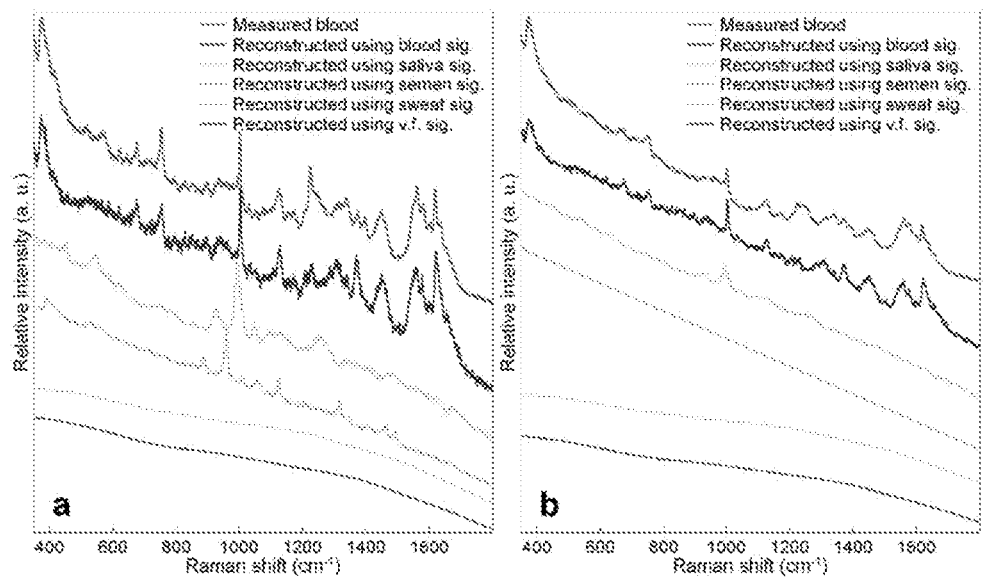
FIGs. 5A-B
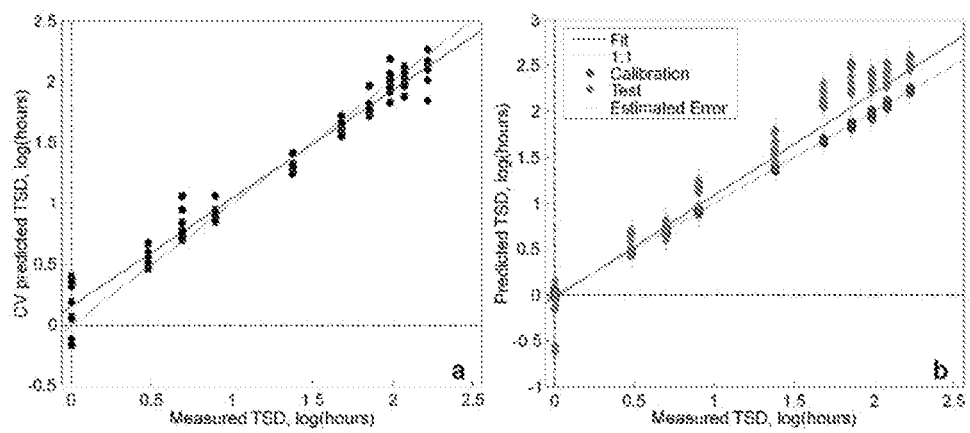
FIGs. 6A-B

SPECTROSCOPIC METHODS FOR BODY FLUID AGE DETERMINATION

This application is a national stage application under 35 U.S.C. § 371 of PCT Application No. PCT/US16/44837, filed Jul. 29, 2016, which claims the priority benefit of U.S. Provisional Patent Application Ser. No. 62/199,063, filed Jul. 30, 2015, the disclosure of which is hereby incorporated by reference in its entirety.

This invention was made with government support under Award No. 2011-DN-BX-K551 and 2014-DN-BX-K016 awarded by the National Institute of Justice, Office of Justice Programs, U.S. Department of Justice (I.K.L.). The government has certain rights in this invention.

FIELD OF THE INVENTION

The present invention relates to a method of determining the age of body fluid.

BACKGROUND OF THE INVENTION

Effective forensic crime scene processing relies on a rapid, informative, and high throughput investigation starting from evidence discovery and collection at the scene all the way through to analysis in the laboratory (Lee et al., "Crime Scene Reconstruction," *Henry Lee's Crime Scene Handbook*. Elsevier Academic Press: San Diego, Calif. pp. 271-98 (2001)). Especially in cases of violent crimes, such as assaults, murders, or homicides, blood can provide investigators with very critical information (Castro et al., "Review: Biological Evidence Collection and Forensic Blood Identification," (2013); James et al., "Principles of Bloodstain Pattern Analysis: Theory and Practice," CRC Press (2005); Bevel et al., "Bloodstain Pattern Analysis with an Introduction to Crime Scene Reconstruction," CRC Press (2008)). Knowing the age, or time since deposition (TSD), of a bloodstain can assist investigations in at least two ways: it can establish when a crime occurred, and it can discriminate bloodstains that relate to the crime from those that are extraneous. Primarily for these reasons, it has been a major goal in the field to establish a technique for determining the TSD of bloodstains accurately (Bremmer et al., "Forensic Quest for Age Determination of Bloodstains," *Forensic Sci. Int* 216(1-3):1-11 (2012)).

Various presumptive (Spalding, R. P., "Identification and Characterization of Blood and Bloodstains," In: James et al., Eds., *Forensic Science: An Introduction to Scientific and Investigative Techniques*, CRC Press:Boca Raton, pp. 181-201 (2009); Kobilinsky, L., "Forensic Chemistry Handbook," John Wiley & Sons (2012); Vandenberg et al., "The Use of Polilight in the Detection of Seminal Fluid, Saliva, and Bloodstains and Comparison with Conventional Chemical-Based Screening Tests," *J. Forensic Sci.* 51(2):361-370 (2006); Webb et al., "A Comparison of the Presumptive Luminol Test for Blood with Four Non-Chemiluminescent Forensic Techniques," *Luminescence* 21:214-20 (2006); Lin et al., "Forensic Applications of Infrared Imaging for the Detection and Recording of Latent Evidence," *J. Forensic Sci.* 52(5):1148-50 (2007); Johnston et al., "Comparison of Presumptive Blood Test Kits Including Hexagon OBTI," *J. Forensic Sci.* 53(3):687-9 (2008); Brooke et al., "Multimode Imaging in the Thermal Infrared for Chemical Contrast Enhancement. Part 3: Visualizing Blood on Fabrics," *Anal. Chem.* 82(20):8427-31 (2010)) and confirmatory (Dixon et al., "A Scanning Electron Microscope Study of Dried Blood," *J. Forensic Sci.* 21(4):797-803 (1976); Sottolano et al., "An Improved Technique for the Preparation of Teichman and Takayama Crystals from Blood," *The Microscope* 28(2):41-6 (1980); Kotowski et al., "The Use of Microspectrophotometry to Characterize Microscopic Amounts of Blood," *J. Forensic Sci.* 31(3):1079-85 (1986); Kashyap, V. K., "A Simple Immunosorbent Assay for Detection of Human Blood," *J. Immunoassay* 10(4):315-24 (1989); U.S. Pat. No. 7,270,983 to Ballantyne et al.; Bauer, M., "RNA in Forensic Science," *Forensic Sci. Int. Genet.* 1:69-74 (2007); Bauer et al., "Identification of Menstrual Blood by Real Time RT-PCR: Technical Improvements and the Practical Value of Negative Test Results," *Forensic Sci. Int* 174:55-9 (2008); Haas et al., "mRNA Profiling for Body Fluid Identification by Reverse Transcription Endpoint PCR and Real-time PCR," *Forensic Sci. Int. Genet.* 3(2):80-8 (2009)) tests can be used to check for the presence of blood, but they each have considerable disadvantages. In a 2009 review article of forensic body fluid testing, Virkler et al. stated that, although highly desired, no single in-field method exists that is non-destructive, applicable to multiple body fluids, and provides a confirmatory result (Virkler et al., "Analysis of Body Fluids for Forensic Purposes: From Laboratory Testing to Non-Destructive Rapid Confirmatory Identification at a Crime Scene," *Forensic Sci. Int* 188(1-3):1-17 (2009)). While it is preferable to conclusively identify a stain as blood before DNA testing, this is almost never done in practice due to the lack of time and money (Kobilinsky, L., "Forensic Chemistry Handbook," John Wiley & Sons (2012)). Some of the problems associated with current identification methods have been addressed by applying Raman spectroscopy with advanced statistical methods. The use of this approach allowed to differentiate between six body fluids (Sikirzhytski et al., "Multidimensional Raman Spectroscopic Signatures as a Tool for Forensic Identification of Body Fluid Traces: A Review," *Appl. Spectrosc.* 65(11):1223-32 (2011)) and to create multidimensional spectroscopic signatures for blood (Virkler et al., "Raman Spectroscopic Signature of Blood and its Potential Application to Forensic Body Fluid Identification," *Anal. Bioanal. Chem.* 396(1):525-34 (2010); McLaughlin et al., "A Modified Raman Multidimensional Spectroscopic Signature of Blood to Account for the Effect of Laser Power," *Forensic Sci. Int* 240:88-94 (2014)), saliva (Virkler et al., "Forensic Body Fluid Identification: The Raman Spectroscopic Signature of Saliva," *Analyst* 135(3):512-7 (2010)), semen (Virkler et al., "Raman Spectroscopic Signature of Semen and its Potential Application to Forensic Body Fluid Identification," *Forensic Sci. Int* 193(1-3):56-62 (2009)), sweat (Sikirzhytski et al., "Multidimensional Raman Spectroscopic Signature of Sweat and its Potential Application to Forensic Body Fluid Identification," *Anal. Chim. Acta.* 718 (0):78-83 (2012)), and vaginal fluid (Sikirzhytskaya et al., "Raman Spectroscopic Signature of Vaginal Fluid and its Potential Application in Forensic Body Fluid Identification," *Forensic Sci. Int* 216(1-3):44-8 (2012)), which took into account dry samples' heterogeneity and donor variations. Differentiation between human and animal blood (Virkler et al., "Blood Species Identification for Forensic Purposes Using Raman Spectroscopy Combined with Advanced Statistical Analysis," *Anal. Chem.* 81(18):7773-7 (2009); McLaughlin et al., "Discrimination of Human and Animal Blood Traces via Raman Spectroscopy," *Forensic Sci Int* 238(0):91-5 (2014); McLaughlin et al., "Raman Spectroscopy of Blood for Species Identification," *Anal. Chem.* 86(23):11628-33 (2014)) as well as peripheral and menstrual blood (Sikirzhytskaya et al., "Raman Spectroscopy Coupled with Advanced Statistics for Differentiating Menstrual and Peripheral Blood," *J. Biophotonics* 7(1-2):59-67 (2014)) was performed. In addition, substrates' interference with blood (McLaughlin et al., "Circumventing Substrate Interference in the Raman Spectroscopic Identification of Blood Stains," *Forensic Sci. Int* 231(1-3):157-66 (2013)) and semen (McLaughlin et al., "In Situ Identification of Semen Stains on Common Substrates via Raman Spectroscopy," *J. Forensic Sci.* 595-604 (2015)) stains, contaminated bloodstains (Sikirzhytskaya et al., "Forensic Identification of Blood in the Presence of Contaminations Using Raman Microspectroscopy Coupled with Advanced Statistics: Effect of Sand, Dust, and Soil," *J. Forensic Sci.* 58(5): 1141-8 (2013)), and body fluid mixtures (Sikirzhytski et al., "Advanced Statistical Analysis of Raman Spectroscopic Data for the Identification of Body Fluid Traces: Semen and Blood Mixtures," *Forensic Sci. Int* 222(1-3):259-65 (2012)) was investigated.

The chemical and physical changes in blood as it ages have been well-characterized. Specifically, the changes related to hemoglobin in dried blood over time are well-known (Marrone et al., "Changes in Dry State Hemoglobin Over Time Do Not Increase the Potential for Oxidative DNA Damage in Dried Blood," *PLoS ONE* 4(4): e5110-e-8 (2009)). However, kinetics studies of blood using near infrared (NIR) Raman spectroscopy are limited. The hemoglobin component in blood can exist in the oxygenated or the de-oxygenated form. Oxygenated hemoglobin (oxyHb), containing the ferrous ($Fe^{2+}$) form of iron, can be oxidized into met-hemoglobin (metHb), containing the ferric ($Fe^{3+}$) form of iron, which cannot bind oxygen. Inside the body, metHb can be reduced back to oxyHb by the NADH-dependent enzyme cytochrome-b5 reductase (Bremmer et al., "Forensic Quest for Age Determination of Bloodstains," *Forensic Sci. Int.* 216(1-3):1-11 (2012)). However, outside of the body hemoglobin loses its ability to transport oxygen and instead goes through specific changes that lead to its denaturation and aggregation: oxyHb is autoxidized to metHb, but, since the enzyme cytochrome-b5 reductase is not present, metHb cannot be reduced back to oxyHb. Over time, metHb will degrade and can form hemichrome (Hc) (Bremmer et al., "Forensic Quest for Age Determination of Bloodstains," *Forensic Sci. Int* 216(1-3):1-11 (2012)). Hemichromes have been identified as denatured forms of Hb, which possess somewhat different structural geometry and therefore slightly different Raman spectra than native Hb itself (Asghari-Khiavi et al., "A Resonance Raman Spectroscopic Investigation into the Effects of Fixation and Dehydration on Heme Environment of Hemoglobin," *J. Raman Spectrosc.* 40(11):1668-74 (2009)).

Currently, there is no well-accepted, accurate, and validated method for determining the age of a bloodstain. A variety of techniques have been used to estimate the TSD, reviewed in 2012 by Bremmer et al. (Bremmer et al., "Forensic Quest for Age Determination of Bloodstains," *Forensic Sci. Int* 216(1-3):1-11 (2012)). That review concluded that the current techniques "are still in the experimental phase and come along with large standard deviations and inaccurate age estimation". Some of the techniques included in that review were a real-time reverse transcriptase polymerase chain reaction (Anderson et al., "A Method for Determining the Age of a Bloodstain," *Forensic Sci. Int* 148(1):37-45 (2005); Alrowaithi et al., "A Method for Determining the Age of a Bloodstain," *Forensic Sci. Int* 234:e30-1 (2014); Bauer et al., "Quantification of RNA Degradation by Semi-Quantitative Duplex and Competitive RT-PCR: A Possible Indicator of the Age of Bloodstains?," *Forensic Sci. Int* 138(1-3):94-103 (2003)), high performance liquid chromatography (Andrasko, J., "The Estimation of Age of Bloodstains by HPLC Analysis," *J. Forensic Sci.* 42(4):601-7 (1997); Inoue et al., "Identification of Fetal Hemoglobin and Simultaneous Estimation of Bloodstain Age by High-Performance Liquid Chromatography," *Int. J. Legal Med.* 104(3):127-31 (1991)), reflectance spectroscopy (Bremmer et al., "Age Estimation of Blood Stains by Hemoglobin Derivative Determination using Reflectance Spectroscopy," *Forensic Sci. Int* 206(1-3):166-71 (2011); Bremmer et al., "Remote Spectroscopic Identification of Bloodstains," *J. Forensic Sci.* 56(6):1471-5 (2011)), force spectroscopy (Strasser et al., "Age Determination of Blood Spots in Forensic Medicine by Force Spectroscopy," *Forensic Sci. Int* 170(1):8-14 (2007)), UV-VIS spectrophotometric analysis (Hanson et al., "A Blue Spectral Shift of the Hemoglobin Soret Band Correlates with the Age (Time Since Deposition) of Dried Bloodstains," *PLoS ONE* 5(9): e12830 (2010)), electron paramagnetic resonance spectroscopy (Fujita et al., "Estimation of the Age of Human Bloodstains by Electron Paramagnetic Resonance Spectroscopy: Long-Term Controlled Experiment on the Effects of Environmental Factors," *Forensic Sci. Int* 152(1):39-43 (2005)), infrared spectroscopy (Botonjic-Sehic et al., "Forensic Application of Near-Infrared Spectroscopy: Aging of Bloodstains," *Spectroscopy* 24(2):42-8 (2009)), and Raman spectroscopy (Asghari-Khiavi et al., "A Resonance Raman Spectroscopic Investigation into the Effects of Fixation and Dehydration on Heme Environment of Hemoglobin," *J. Raman Spectrosc.* 40(11):1668-74 (2009); Dasgupta et al., "Hemoglobin Degradation in Human Erythrocytes with Long-Duration Near-Infrared Laser Exposure in Raman Optical Tweezers," *J. Biomed. Opt.* 15(5):055009-11 (2010); Boyd et al., "Raman Spectroscopy of Blood Samples for Forensic Applications," *Forensic Sci. Int* 208(1-3):124-8 (2011)). Furthermore, some of the approaches outlined consume part of the sample, which is a disadvantage from a forensic perspective. Since that review there have been other approaches to determine the TSD of bloodstains including the use of smartphones for quantifiable color change correlations (Thanakiatkrai et al., "Age Estimation of Bloodstains Using Smartphones and Digital Image Analysis," *Forensic Sci. Int* 233(1-3):288-97 (2013)), a bioaffinity-based assay (Agudelo et al., "Forensic Determination of Blood Sample Age Using a Bioaffinity-Based Assay," *Analyst* 140(5): 1411-5 (2015)), fluorescence lifetime measurements (Guo et al., "Dating Bloodstains with Fluorescence Lifetime Measurements," *Chemistry—A European Journal* 18(5):1303-5 (2012)), and various types of spectroscopy (Li et al., "The Estimation of the Age of a Blood Stain using Reflectance Spectroscopy with a Microspectrophotometer, Spectral Pre-Processing and Linear Discriminant Analysis," *Forensic Sci. Int* 212(1-3):198-204 (2011); Li et al., "The Age Estimation of Blood Stains Up to 30 Days Old using Visible Wavelength Hyperspectral Image Analysis and Linear Discriminant Analysis," *Sci. Justice* 53(3):270-7 (2013); Edelman et al., "Hyperspectral Imaging for the Age Estimation of Blood Stains at the Crime Scene," *Forensic Sci. Int* 223(1-3):72-7 (2012); Edelman et al., "Hyperspectral Imaging for Non-Contact Analysis of Forensic Traces," *Forensic Sci. Int* 223(1-3):28-39 (2012); Premasiri et al., "Surface-Enhanced Raman Scattering of Whole Human Blood, Blood Plasma, and Red Blood Cells: Cellular Processes and Bioanalytical Sensing," *J. Phys. Chem. B* 116(31):9376-86 (2012); Lemler et al., "NIR Raman Spectra of Whole Human Blood: Effects of Laser-Induced and In Vitro Hemoglobin Denaturation," *Anal. Bioanal. Chem.* 406(1):193-200 (2014)), some of which are explained in more detail below.

Li et al. used reflectance spectroscopy, with linear discriminant analysis (LDA), to estimate the age of an equine bloodstain on white tile. They obtained an accuracy of 99.2% correct classification from 1 to 37 days using the same bloodstain for model training and testing, but only 54.7% correct classification up to 19 days (average error of 0.71 days) when using different bloodstains for model training and testing (Li et al., "The Estimation of the Age of a Blood Stain using Reflectance Spectroscopy with a Microspectrophotometer, Spectral Pre-Processing and Linear Discriminant Analysis," *Forensic Sci. Int* 212(1-3):198-204 (2011)). In a more recent study, Li et al. used hyperspectral imaging (HSI) and LDA to estimate the age of an equine bloodstain up to 1 week and up to 30 days with average errors of ±0.27 days and ±1.17 days, respectively (Li et al., "The Age Estimation of Blood Stains Up to 30 Days Old using Visible Wavelength Hyperspectral Image Analysis and Linear Discriminant Analysis," *Sci. Justice* 53(3):270-7 (2013)). Edelman et al. used HSI to obtain a median relative error of 13.4% of the actual age of bloodstains up to 200 days, based on the relative amount of Hb derivatives present (Edelman et al., "Hyperspectral Imaging for the Age Estimation of Blood Stains at the Crime Scene," *Forensic Sci. Int* 223(1-3):72-7 (2012)). In a different study, Edelman et al. used HSI for bloodstains on colored substrates and demonstrated 100% specificity and sensitivity for distinguishing other substances from actual bloodstains. Also, a partial least squares regression (PLSR) model was built to estimate the age of the bloodstains providing a root mean squared error of prediction (RMSEP) of 8.9% for up to 1 month (Edelman et al., "Hyperspectral Imaging for Non-Contact Analysis of Forensic Traces," *Forensic Sci. Int* 223(1-3):28-39 (2012)).

The Ziegler research group has used both surface-enhanced Raman spectroscopy (SERS) and NIR Raman spectroscopy for bloodstain age comparisons (Premasiri et al., "Surface-Enhanced Raman Scattering of Whole Human Blood, Blood Plasma, and Red Blood Cells: Cellular Processes and Bioanalytical Sensing," *J. Phys. Chem. B* 116 (31):9376-86 (2012); Lemler et al., "NIR Raman Spectra of Whole Human Blood: Effects of Laser-Induced and In Vitro Hemoglobin Denaturation," *Anal. Bioanal. Chem.* 406(1): 193-200 (2014)). Raman spectroscopy is a highly specific and non-destructive analytical technique that utilizes monochromatic laser light to irradiate a sample. A spectrum is generated by collecting the inelastic scattering of photons. In Ziegler's NIR Raman spectroscopic study, various spectral trends were identified in bloodstains up to two weeks old, particularly for distinguishing between oxyHb and metHb (Lemler et al., "NIR Raman Spectra of Whole Human Blood: Effects of Laser-Induced and In Vitro Hemoglobin Denaturation," *Anal. Bioanal. Chem.* 406(1):193-200 (2014)). The most distinct difference was determined for the band at 377 $cm^{-1}$ in the metHb spectra, indicative of the heme protein being in a high-spin ferric state.

The present invention is directed to overcoming these and other deficiencies in the art.

SUMMARY OF THE INVENTION

One aspect of the present invention relates to a method of determining the age of a body fluid stain in a sample. This method includes providing the sample containing a body fluid stain; providing a statistical model for determination of the age of the body fluid stain in the sample; subjecting the sample or an area of the sample containing the stain to a spectroscopic analysis to produce a spectroscopic signature for the sample; and applying the spectroscopic signature for the sample to the statistical model to ascertain the age of the body fluid stain in the sample.

Another aspect of the present invention relates to a method of establishing a statistical model for determination of the age of a body fluid stain in a sample. This method includes providing a plurality of samples each containing a known type and age of a body fluid stain; subjecting each sample or an area of each sample containing the stain to a spectroscopic analysis to produce a spectroscopic signature for each sample; and establishing a statistical model for determination of the age of the stain in the sample based on said subjecting.

Knowing the time since deposition (TSD) of an evidentiary body fluid stain is highly desired in forensics, yet it can be extremely complicated to accurately determine in practice. Although there have been numerous attempts to solve this problem using a variety of different techniques, currently no established, well-accepted method exists. The present application describes a Raman spectroscopic approach that was developed for determining the age of bloodstains up to one week old. Data analysis was taken a step further to better understand the order of the kinetic events, and two-dimensional correlation spectroscopy (2D CoS) of the Raman spectroscopic data was utilized (Noda et al., "Two-Dimensional Correlation Spectroscopy: Applications in Vibrational and Optical Spectroscopy," John Wiley & Sons, Inc.:Hoboken, N.J. (2004), which is hereby incorporated by reference in its entirety). The 2D CoS results indicated a high correlation between several Raman bands and the age of a bloodstain. A regression model was built to provide quantitative predictions of the TSD, with cross-validated root mean squared error and $R^2$ values of 0.13 and 0.97, respectively. It was determined that a 'new' (1 hour old) bloodstain could be easily distinguished from older bloodstains, which is very important for forensic science in helping to establish the relevant association of multiple bloodstains. Additionally, all bloodstains were confirmatively identified as blood by comparing the experimentally measured spectra to multidimensional body fluid spectroscopic signatures of blood, saliva, semen, sweat, and vaginal fluid. In order to predict the age of the bloodstain, a PLSR calibration curve was built. This PLSR model was tested with a completely external dataset of blood spectra from a separate donor than that used to construct the model. These results demonstrated that Raman spectroscopy can be used as a nondestructive analytical tool for discriminating between bloodstains on the scale of hours to month. This approach shows promise for immediate practical use in the field to predict the TSD with a high degree of accuracy.

A kinetic study for the analysis and prediction of the time since deposition (TSD) of bloodstains has been carried out. Bloodstains from two donors (one male and one female) were stored in ambient conditions (room temperature, RT) for up to one year. To account for the effect of the environment, bloodstains were also stored at increased (32° C.) and decreased (4° C.) temperature for up to 9 months each and in a high (80%) humidity (HH) environment for up to 1 month. Mold was noticed on all bloodstains after 1 month and therefore spectral collection was terminated after this time point. Raman spectroscopy was used to collected spectral maps of all bloodstains for each time point considered. Spectral changes over time were observed for all environments where the most inconsistent changes were observed for the HH and decreased temperature environments. Partial least squares regression (PLSR) analysis was used for predicting the TSD of all bloodstains up to the latest time point collected. To determine the accuracy of prediction of the PLSR models, cross-validated (CV) values for the root mean squared error (RMSE) and coefficient of correlation ($R^2$) were calculated. Based on these two metrics, bloodstains stored at RT and 32° C. showed the best CV TSD prediction results with RMSECV/$R^2$ values of 0.17/0.98 and 0.13/0.99, respectively, whereas these values for bloodstains stored at 4° C. and at HH were 0.33/0.90 and 0.32/0.85, respectively. The PLSR model for bloodstains stored at RT was tested with blood spectra from a separate donor where the RMSE and $R^2$ prediction results were 0.32 and 0.97, respectively.

Raman spectra were collected from menstrual blood samples as part of a kinetic study of bloodstain aging. Spectra from 1 hour to 4 months were collected from a trace stored in an ambient environment, while spectra from a sample stored in the humid environment were only collected for one week. The first PLSR model was built on the spectra collected from the sample stored in the ambient environment, which resulted in a $R^2CV$ of 0.89 and RMSECV of 0.38. The spectra collected in the high humidity environment were used to build a second PLSR model, which resulted in a $R^2CV$ of 0.90 and RMSECV of 0.25. The results from internal cross-validation show a good relationship between the Raman spectra of menstrual blood and the age of the trace that indicates that the TSD can be determined for dry traces of menstrual blood based on Raman spectroscopy.

The age of a menstrual bloodstain has been studied using Raman spectroscopy. Samples were prepared and stored in two different environments, ambient and humid conditions. Spectra were collected at 14 pre-determined time points, scheduled to span one year. After collection, spectra were imported into MATLAB, preprocessed, and used to build calibration datasets. Few spectral trends were visible in these datasets, but regression modeling showed correlation between the spectra and TSD. The PLSR model built on the data collected in the ambient environment had an $R^2CV$ of 0.89, and an RMSECV of 0.38. The spectra from the humid environment resulted in a PLSR model with an $R^2CV$ of 0.90 and an RMSECV of 0.25.

BRIEF DESCRIPTION OF THE DRAWINGS

FIGS. 5A-B are graphs showing the averaged experimentally measured bloodstain spectrum (red) and the reconstructed spectra using multidimensional spectroscopic signatures for blood (royal blue), saliva (cyan), semen (pink), sweat (yellow), and vaginal fluid (v.f, green) at the first (1 hour) (FIG. 5A) and final (168 hours) (FIG. 5B) time points. Spectra have been normalized by total area.

FIGS. 6A-B are graphs showing PLSR plots for blood samples up to one week. FIG. 6A is a graph showing an internally cross-validated TSD predictions versus the measured (actual) TSD. FIG. 6B is a graph showing TSD predictions for both internal (black circles) and external (red diamonds) datasets versus the measured (actual) TSD, with the estimated errors included. The red line demonstrates the actual fit and the green line is the ideal 1:1 fit.

DETAILED DESCRIPTION OF THE INVENTION

Figure 1:
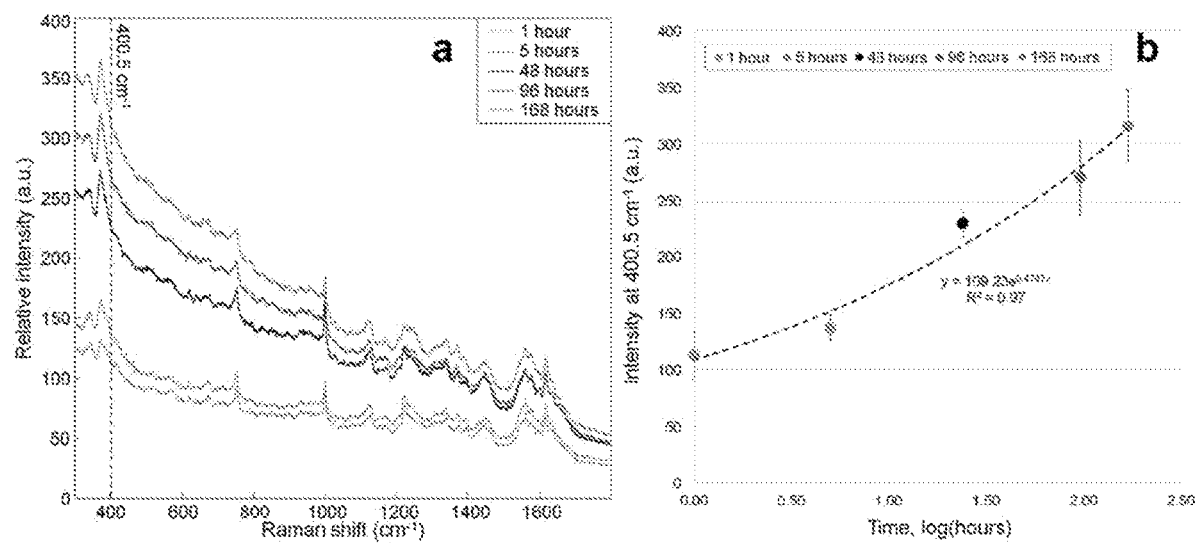
FIGS. 1A-B are graphs showing the averaged raw spectra at increasing time points that show the change in fluorescence (FIG. 1A) and the trend of the intensity of the peak at 400.5 cm$^{-1}$ for all raw spectra over time with an exponential fit trendline (FIG. 1B).

One aspect of the present invention relates to a method of determining the age of a body fluid stain in a sample. This method includes providing the sample containing a body fluid stain; providing a statistical model for determination of the age of the body fluid stain in the sample; subjecting the sample or an area of the sample containing the stain to a spectroscopic analysis to produce a spectroscopic signature for the sample; and applying the spectroscopic signature for the sample to the statistical model to ascertain the age of the body fluid stain in the sample.

In one embodiment, the body fluid is selected from the group consisting of blood, saliva, sweat, urine, semen, and vaginal fluid. In a preferred embodiment, the body fluid is blood.

In another embodiment, the sample is recovered at a crime scene.

In another embodiment, the spectroscopic analysis is selected from the group consisting of Raman spectroscopy, mass spectrometry, fluorescence spectroscopy, laser induced breakdown spectroscopy, infrared spectroscopy, scanning electron microscopy, X-ray diffraction spectroscopy, powder diffraction spectroscopy, X-ray luminescence spectroscopy, inductively coupled plasma mass spectrometry, capillary electrophoresis, and atomic absorption spectroscopy.

Raman spectroscopy is a spectroscopic technique which relies on inelastic or Raman scattering of monochromatic light to study vibrational, rotational, and other low-frequency modes in a system (Gardiner, D. J., *Practical Raman Spectroscopy*, Berlin: Springer-Verlag, pp. 1-3 (1989), which is hereby incorporated by reference in its entirety). Vibrational modes are very important and very specific for chemical bonds in molecules. They provide a fingerprint by which a molecule can be identified. The Raman effect is obtained when a photon interacts with the electron cloud of a molecular bond exciting the electrons into a virtual state. The scattered photon is shifted to lower frequencies (Stokes process) or higher frequencies (anti-Stokes process) as it abstracts or releases energy from the molecule. The polarizability change in the molecule will determine the Raman scattering intensity, while the Raman shift will be equal to the vibrational intensity involved.

Raman spectroscopy is based upon the inelastic scattering of photons or the Raman shift (change in energy) caused by molecules. The analyte is excited by laser light and upon relaxation scatters radiation at a different frequency which is collected and measured. With the availability of portable Raman spectrometers it is possible to collect Raman spectra in the field. Using portable Raman spectrometers offers distinct advantages to government agencies, first responders and forensic scientists (Hargreaves et al., "Analysis of Seized Drugs Using Portable Raman Spectroscopy in an Airport Environment—a Proof of Principle Study," *J. Raman Spectroscopy* 39(7): 873-880 (2008), which is hereby incorporated by reference in its entirety).

Raman spectroscopy is increasing in popularity among the different disciplines of forensic science. Some examples of its use today involve the identification of drugs (Hodges et al., "The Use of Fourier Transform Raman Spectroscopy in the Forensic Identification of Illicit Drugs and Explosives, "*Molecular Spectroscopy* 46:303-307 (1990), which is hereby incorporated by reference in its entirety), lipsticks (Rodger et al., "The In-Situ Analysis of Lipsticks by Surface Enhanced Resonance Raman Scattering," *Analyst* 1823-1826 (1998), which is hereby incorporated by reference in its entirety), and fibers (Thomas et al., "Raman Spectroscopy and the Forensic Analysis of Black/Grey and Blue Cotton Fibers Part 1: Investigation of the Effects of Varying Laser Wavelength," *Forensic Sci. Int* 152:189-197 (2005), which is hereby incorporated by reference in its entirety), as well as paint (Suzuki et al., "In Situ Identification and Analysis of Automotive Paint Pigments Using Line Segment Excitation Raman Spectroscopy: I. Inorganic Topcoat Pigments," *J. Forensic Sci.* 46:1053-1069 (2001), which is hereby incorporated by reference in its entirety) and ink (Mazzella et al., "Raman Spectroscopy of Blue Gel Pen Inks," *Forensic Sci. Int* 152:241-247 (2005), which is hereby incorporated by reference in its entirety) analysis. Very little or no sample preparation is needed, and the required amount of tested material could be as low as several picograms or femtoliters ($10^{-12}$ gram or $10^{-15}$ liter, respectively). A typical Raman spectrum consists of several narrow bands and provides a unique vibrational signature of the material (Grasselli et al., "Chemical Applications of Raman Spectroscopy," New York: John Wiley & Sons (1981), which is hereby incorporated by reference in its entirety). Unlike infrared (IR) absorption spectroscopy, another type of vibrational spectroscopy, Raman spectroscopy shows very little interference from water (Grasselli et al., "Chemical Applications of Raman Spectroscopy," New York: John Wiley & Sons (1981), which is hereby incorporated by reference in its entirety). Proper Raman spectroscopic measurements do not damage the sample. A swab could be tested in the field and still be available for further use in the lab, and that is very important to forensic application. The design of a portable Raman spectrometer is a reality now (Yan et al., "Surface-Enhanced Raman Scattering Detection of Chemical and Biological Agents Using a Portable Raman Integrated Tunable Sensor," *Sensors and Actuators B*. 6 (2007); Eckenrode et al., "Portable Raman Spectroscopy Systems for Field Analysis," *Forensic Science Communications* 3(2001), which are hereby incorporated by reference in their entirety) which could lead to the ability to make identifications at the crime scene.

Fluorescence interference is the largest problem with Raman spectroscopy and is perhaps the reason why the latter technique has not been more popular in the past. If a sample contains molecules that fluoresce, the broad and much more intense fluorescence peak will mask the sharp Raman peaks of the sample. There are a few remedies to this problem. One solution is to use deep ultraviolet (DUV) light for exciting Raman scattering (Lednev I. K., "Vibrational Spectroscopy: Biological Applications of Ultraviolet Raman Spectroscopy," in: V. N. Uversky, and E. A. Permyakov, *Protein Structures, Methods in Protein Structures and Stability Analysis* (2007), which is hereby incorporated by reference in its entirety). Practically no condensed face exhibits fluorescence below ~250 nm. Possible photodegradation of biological samples is an expected disadvantage of DUV Raman spectroscopy. Another option to eliminate fluorescence interference is to use a near-IR (NIR) excitation for Raman spectroscopic measurement. Finally, surface enhanced Raman spectroscopy (SERS) which involves a rough metal surface can also alleviate the problem of fluorescence (Thomas et al., "Raman Spectroscopy and the Forensic Analysis of Black/Grey and Blue Cotton Fibers Part 1: Investigation of the Effects of Varying Laser Wavelength," *Forensic Sci. Int* 152:189-197 (2005), which is hereby incorporated by reference in its entirety). However, this method requires direct contact with the analyte and cannot be considered to be nondestructive.

Basic components of a Raman spectrometer are (i) an excitation source; (ii) optics for sample illumination; (iii) a single, double, or triple monochromator; and (iv) a signal processing system consisting of a detector, an amplifier, and an output device.

Typically, a sample is exposed to a monochromatic source usually a laser in the visible, near infrared, or near ultraviolet range. The scattered light is collected using a lens and is focused at the entrance slit of a monochromator. The monochromator which is set for a desirable spectral resolution rejects the stray light in addition to dispersing incoming radiation. The light leaving the exit slit of the monochromator is collected and focused on a detector (such as a photodiode arrays (PDA), a photomultiplier (PMT), or charge-coupled device (CCD)). This optical signal is converted to an electrical signal within the detector. The incident signal is stored in computer memory for each predetermined frequency interval. A plot of the signal intensity as a function of its frequency difference (usually in units of wavenumbers, $cm^{-1}$) will constitute the Raman spectroscopic signature.

Raman signatures are sharp and narrow peaks observed on a Raman spectrum. These peaks are located on both sides of the excitation laser line (Stoke and anti-Stoke lines). Generally, only the Stokes region is used for comparison (the anti-Stoke region is identical in pattern, but much less intense) with a Raman spectrum of a known sample. A visual comparison of these set of peaks (spectroscopic signatures) between experimental and known samples is needed to verify the reproducibility of the data. Therefore, establishing correlations between experimental and known data is required to assign the peaks in the molecules, and identify a specific component in the sample.

The types of Raman spectroscopy suitable for use in conjunction with the present invention include, but are not limited to, conventional Raman spectroscopy, Raman microspectroscopy, near-field Raman spectroscopy, including but not limited to the tip-enhanced Raman spectroscopy, surface enhanced Raman spectroscopy (SERS), surface enhanced resonance Raman spectroscopy (SERRS), and coherent anti-Stokes Raman spectroscopy (CARS). Also, both Stokes and anti-Stokes Raman spectroscopy could be used.

In addition to Raman spectroscopy, the spectroscopic analysis of the present invention can be performed using, for example, mass spectrometry, fluorescence spectroscopy, laser induced breakdown spectroscopy, infrared spectroscopy, scanning electron microscopy, X-ray diffraction spectroscopy, powder diffraction spectroscopy, X-ray luminescence spectroscopy, inductively coupled plasma mass spectrometry, capillary electrophoresis, or atomic absorption spectroscopy. Some of the spectroscopic methods mentioned above, including but not limited to Raman spectroscopy, are relatively simple, rapid, non-destructive, and would allow for the development of a portable instrument. The technique can be performed with relatively small samples, picogram (pg) quantities. The composition of the sample is not changed in any way, allowing for further forensic tests on the residue or other components of the evidence.

Scanning Electron Microscopy combined with Energy Dispersive Spectroscopy (SEM/EDS or EDX when equipped with an X-ray analyzer) is capable of obtaining both morphological information and the elemental composition. Recently, SEM/EDS systems have become automated, making automated computer-controlled SEM the method of choice for most laboratories conducting analyses. Several features of the SEM make it useful in many forensic studies, including magnification, imaging, composition analysis, and automation.

Inductively coupled plasma mass spectrometry (ICP-MS) is a mass analysis method with sensitivity to metals. As a result, this analytical technique is ideal for analyzing barium, lead, and antimony. This technique is known for its sensitivity, having detection limits that are usually in the parts per billion.

Fourier transform infrared (FTIR) spectroscopy is a versatile tool for the detection, estimation and structural determination of organic compounds such as drugs, explosives, and organic components. Due to the availability of portable IR spectrometers, it will be possible to analyze the samples at scenes remote from laboratories. Capillary electrophoresis (CE) is another suitable analytical technique. The significant advantage of CE is the low probability of false positives (Bell, S., *Forensic Chemistry*, Pearson Education: Upper Saddle River, N.J. (2006), which is hereby incorporated by reference in its entirety).

Atomic absorption spectroscopy (AAS) is a bulk method of analysis used in the analysis of inorganic materials in primer residue, namely Ba and Sb. The high sensitivity for a small volume of sample is one advantage of AAS. This technique involves the absorption of thermal energy by the sample and subsequent emission of some or all of the energy in the form of radiation (Bauer et al., *Instrumental Analysis*, Allyn and Bacon, Inc.: Boston (1978), which is hereby incorporated by reference in its entirety). These emissions are generally unique for specific elements and thus give information about the composition of the sample. Laser-induced breakdown spectroscopy (LIBS) is a type of atomic emission spectroscopy that implements lasers to excite the sample. Rather than flame AAS, LIBS is accessible to field testing because of the availability of portable LIBS systems.

X-ray diffraction (XRD) is one such technique that can be used for the characterization of a wide variety of substances of forensic interest (Abraham et al., "Application of X-Ray Diffraction Techniques in Forensic Science," *Forensic Science Communications* 9(2) (2007), which is hereby incorporated by reference in its entirety). XRD is capable of obtaining information about the actual structure of samples, in a non-destructive manor.

In one embodiment, the spectroscopic analysis is Raman spectroscopy. In a preferred embodiment Raman spectroscopy is selected from the group consisting of resonance Raman spectroscopy, normal Raman spectroscopy, Raman microscopy, Raman microspectroscopy, NIR Raman spectroscopy, surface enhanced Raman spectroscopy (SERS), tip enhanced Raman spectroscopy (TERS), Coherent anti-Stokes Raman scattering (CARS), and Coherent anti-Stokes Raman scattering microscopy.

In another embodiment, the spectroscopic analysis is Infrared spectroscopy. In a preferred embodiment the Infrared spectroscopy is selected from the group consisting of Infrared microscopy, Infrared microspectroscopy, Infrared reflection spectroscopy, Infrared absorption spectroscopy, attenuated total reflection infrared spectroscopy, Fourier transform infrared spectroscopy, and attenuated total reflection Fourier transform infrared spectroscopy.

The spectroscopic signature can be obtained from: spectra at different locations of the sample of the body fluid; a single spectrum of the sample of the body fluid; or as an average of spectra collected at different locations of the sample.

In the present invention, the term "spectroscopic signature" refers to a single spectrum, an averaged spectrum, multiple spectra, or any other spectroscopic representation of intrinsically heterogeneous samples.

In one embodiment, the method further comprises subjecting the spectra to a two-dimensional correlation spectroscopy (2D CoS).

Two-dimensional correlation spectroscopy (2D CoS) is a universal spectroscopic tool, generally applicable to a very wide range of applications. Two-dimensional correlation spectra are generated from perturbation-induced dynamic fluctuations of spectroscopic signals. When an external perturbation (stimulus) is applied to a system, various chemical constituents of the system are selectively excited. The excitation and subsequent relaxation processes toward the equilibrium are monitored with electromagnetic probes. Typical spectral changes observed under dynamic perturbation are the variation of intensities, shift of spectral band positions, and change in the shape of peaks. The monitored fluctuation of spectral signals is then transformed into two-dimensional spectra by using a correlation method. 2D CoS was initially developed for kinetic studies and the initial (kinetics) terminology is use for other cases when the perturbation occurs due to various external stimuli.

A two-dimensional (2D) correlation method is generally applicable to various types of spectroscopy, including IR and Raman spectroscopy. In the 2D correlation scheme, an external perturbation is applied to a system while being monitored by an electromagnetic probe. With the application of a correlation analysis to spectral intensity fluctuations induced by the perturbation, new types of spectra defined by two independent spectral variable axes are obtained. Such two-dimensional correlation spectra emphasize spectral features not readily observable in conventional one-dimensional spectra.

In another embodiment, the statistical model is a regression model. This statistical model can be prepared by Artificial neural network (ANN), Classical least squares (CLS), Locally weighted regression (LWR), Multiple linear regression (MLR), Designated experimental MLR, Multiway partial least squares (NPLS), Principle component regression (PCR), Partial least squares (PLS), and Support vector machine. In a preferred embodiment the statistical model is partial least squares regression (PLSR) model.

Artificial neural network (ANN) is a family of models inspired by biological neural networks (the central nervous systems of animals, in particular the brain) which are used to estimate or approximate functions that can depend on a large number of inputs and are generally unknown. Artificial neural networks are typically specified using architecture, activity Rule, and learning rule.

Classical least squares (CLS) techniques also known as direct least squares or forward least squares. CLS methods are typically used for exploratory analysis, detection, classification and quantification. CLS regression methods include classical, extended, weighted, and generalized least squares. These methods can be used to account for interferents (i.e. analytes other than the one of interest) in spectroscopic systems. CLS also provides a natural framework for the development of popular de-cluttering methods such as External Parameter Orthogonalization (EPO) and Generalized Least Squares (GLS) weighting.

Locally weighted regression (LWR) is a memory-based method that performs a regression around a point of interest using only training data that are "local" to that point.

Multiple linear regression (MLR) is the most common form of linear regression analysis. As a predictive analysis, the multiple linear regression is used to explain the relationship between one continuous dependent variable from two or more independent variables. The independent variables can be continuous or categorical.

Multiway partial least squares (MPLS) is an extension of the ordinary regression model PLS to the multi-way case. In chemometrics there is some confusion in distinguishing between multi-way methods and multi-way data. Bilinear two-way PLS and PCA can cope with multi-way data by unfolding the data arrays to matrices, but the methods themselves are not multi-way and do not take advantage of any multi-way structure in the data.

Principle component regression (PCR) is a regression analysis technique that is based on principal component analysis (PCA). It considers regressing the outcome (also known as the response or, the dependent variable) on a set of covariates (also known as predictors or, explanatory variables or, independent variables) based on a standard linear regression model, but uses PCA for estimating the unknown regression coefficients in the model.

Partial least squares (PLS) or Partial least squares regression (PLSR) is a statistical method that bears some relation to principal components regression; instead of finding hyperplanes of minimum variance between the response and independent variables, it finds a linear regression model by projecting the predicted variables and the observable variables to a new space. Because both the X and Y data are projected to new spaces, the PLS family of methods are known as bilinear factor models. Partial least squares Discriminant Analysis (PLS-DA) is a variant used when the Y is categorical.

Support vector machines (SVM) are supervised learning models with associated learning algorithms that analyze data used for classification and regression analysis. Given a set of training examples, each marked for belonging to one of two categories, an SVM training algorithm builds a model that assigns new examples into one category or the other, making it a non-probabilistic binary linear classifier.

In another embodiment, the statistical model for determination of the age of a stain in the sample is prepared by Partial least squares discriminant analysis (PLS-DA), Linear discriminant analysis (LDA), Multivariate analysis of variance (MANOVA), Support vector machine (SVM), and Artificial neural network (ANN). These methods can be used alone or in combination with clustering methods for the preparation of the statistical model. Any clustering method can be used for the preparation of the statistical model. The preferred clustering method is selected from the group consisting of Mahalanobis distances-based method, Principal component analysis (PCA), and k-means clustering.

Linear discriminant analysis (LDA) is a generalization of Fisher's linear discriminant, a method used in statistics, pattern recognition and machine learning to find a linear combination of features that characterizes or separates two or more classes of objects or events.

Multivariate analysis of variance (MANOVA) is a procedure for comparing multivariate sample means. As a multivariate procedure, it is used when there are two or more dependent variables, and is typically followed by significance tests involving individual dependent variables separately.

K-Nearest neighbor (KNN) is a non-parametric method used for classification and regression. In both cases, the input consists of the k closest training examples in the feature space.

Soft independent modeling of/by class analogy (SIMCA) is a statistical method for supervised classification of data. The method requires a training data set consisting of samples (or objects) with a set of attributes and their class membership. The term soft refers to the fact the classifier can identify samples as belonging to multiple classes and not necessarily producing a classification of samples into non-overlapping classes.

Another aspect of the present invention relates to a method of establishing a statistical model for determination of the age of a body fluid stain in a sample. This method includes providing a plurality of samples each containing a known type and age of a body fluid stain; subjecting each sample or an area of each sample containing the stain to a spectroscopic analysis to produce a spectroscopic signature for each sample; and establishing a statistical model for determination of the age of the stain in the sample based on said subjecting.

For samples containing a known type and age of a body fluid stain the spectroscopic signature can be obtained from the spectra at: different locations of the same sample of the body fluid; different samples of the same type of body fluid; or different locations on different samples of the same type of body fluid.

In one embodiment, the statistical model for determination of the age of the stain in the sample is for a specific type of stain.

According to the present invention, statistical model for determination of the age of a body fluid stain in a sample can be prepared using any type of the statistical analysis described above.

In one embodiment, the statistical model for determination of the age of a stain in the sample is prepared by regression analysis. This statistical model can be prepared by Artificial neural network (ANN), Classical least squares (CLS), Locally weighted regression (LWR), Multiple linear regression (MLR), Designated experimental MLR, Multiway partial least squares (MPLS), Principle component regression (PCR), Partial least squares (PLS), and Support vector machine. In a preferred embodiment, the statistical model for determination of the age of a stain in the sample is prepared by partial least squares regression (PLSR) analysis.

The statistical model for determination of the age of a stain in the sample can also be prepared by Partial least squares discriminant analysis (PLS-DA), Linear discriminant analysis (LDA), Multivariate analysis of variance (MANOVA), Support vector machine (SVM), and Artificial neural network (ANN). These methods can be used alone or in combination with clustering method for the preparation of the statistical model. Any clustering method can be used for the preparation of the statistical model. A preferred clustering method is selected from the group consisting of Mahalanobis distances-based method, Principal component analysis (PCA), and k-means clustering.

In one embodiment, the method further includes validating the statistical model. Validation of the statistical model can be carried out by any applicable method; preferably, validation is carried by the internal cross-validation. Internal cross-validation can be selected from the group consisting of Venetian blinds method, leave one out method, random subsets method, and contiguous block method.

In another embodiment, the establishing produces a statistical model for determination of the age of a stain in the sample for a specific type of stain.

According to one embodiment, the method of developing a statistical model for determining an age of a body fluid using spectroscopic analysis involves the following steps. First, multiple spectra for samples of a body fluid aged for various periods of time are collected. Second, these spectra are preprocessed. The preprocessing step can be performed using any of the different pre-treatment procedures alone or in different combinations. Next, a statistical model is developed using any of the statistical methods described above alone or in combination. If necessary, the model can then be validated using any of the statistical methods described above alone or in combination (this last step is optional).

According to another embodiment, the method of determining the age of the stain for an unknown sample of a body fluid involves the following steps. First, multiple spectra for an unknown sample are obtained. Second, spectra are preprocessed. Preprocessing step can be performed using any of the above-described pre-treatment procedure alone or in different combinations. Next, the statistical model for determining an age of a body fluid is applied to determine the age of a body fluid stain.

EXAMPLES

Example 1—Sample Preparation for Examples 2-4

Fresh human blood (~30 µL per donor) was procured from a cleaned finger of two (one male and one female) healthy individuals, which was pricked using a lancet, and immediately deposited on an aluminum foil covered microscope slide to dry in ambient (laboratory bench) conditions; the temperature and humidity were not specifically controlled. Recently it has been shown that using aluminum foil as a substrate for Raman analysis of biological samples is advantageous due to the low cost and ease of background subtraction (Cui et al., "Aluminium Foil as a Potential Substrate for ATR-FTIR, Transflection FTIR or Raman Spectrochemical Analysis of Biological Specimens," *Anal. Methods* 8(3): 481-7 (2016), which is hereby incorporated by reference in its entirety). Blood collection was approved by the Institutional Review Board at the University at Albany. All blood donors used for this study supplied written consent, prior to blood donation, for the use of their blood for research purposes. This consent included the donors' acknowledgement that they were healthy, over the age of 18, not using any prescription or recreational drugs, and that they could withdraw from the study at any time without any repercussions.

Blood samples were analyzed using a Horiba LabRAM HR Evolution Raman microscope with a 785 nm laser at 50% power (~1.5 mW at the sample) and a 50× long working distance objective. Automatic mapping was used for collecting a total of nine spectra for each time point surveyed (1, 3, 5, 8, 24, 48, 72, 96, 120, and 168 hours). Each spectrum was collected using ten 15-second accumulations within the range of 300-1800 cm-1. A fresh area (not previously irradiated with the laser light) of each sample was used for Raman spectral measurements at every time point.

Example 2—Two-Dimensional Correlation Spectroscopy (2D CoS)

Prior to 2D correlation spectroscopic analysis, preprocessed (baseline corrected and normalized) spectra were averaged by time point. The 2Dshige software package (Shigeaki Morita, Osaka Electro-Communication University, Japan; version 1.3) was used to generate all 2D CoS maps.

Example 3—Statistical Analysis

All spectra were imported into MATLAB (MathWorks, Inc.; version R2013a) with PLS toolbox (Eigenvector Research, Inc.; version 7.9.3) for data treatment and statistical analysis. Each spectrum was preprocessed by baseline correction using a 6th order polynomial, normalized by total area, and mean-centered before building any regression models. For bloodstain age predictions a PLSR model was built and internally cross-validated (CV) using the Venetian blinds method with nine splits. Subsequently, the performance of the PLSR model was externally validated with a dataset of spectra from a different donor.

The identification process of blood spectra involved building a reconstructed spectrum using the multidimensional spectroscopic signature for each body fluid (i.e. blood, saliva, semen, sweat, and vaginal fluid). Each reconstructed spectrum was then visually compared to the original experimentally measured spectrum to determine spectral similarities and differences. Based on these comparisons, identification of the stain was determined.

Example 4—Results and Discussion of Examples 1-3

Blood Aging Spectral Trends

To investigate the time-dependent changes in Raman spectra of blood, resulting from natural degradation over time, a kinetic experiment was conducted. Raman spectral maps were accumulated on freshly-drawn human blood stored in ambient conditions without the addition of anticoagulants. Spectra were accumulated at ten time points: 1, 3, 5, 8, 24, 48, 72, 96, 120, and 168 hours. The use of freshly-drawn human peripheral blood, without preservatives or anticoagulants, is imperative for the real-world forensic and biomedical relevance of this study, since this is how bloodstains would be found naturally.

The first spectral trend observed was the increasing fluorescence profile intensity with time. The fluorescence background was especially intensified toward the low frequency region of the spectrum. This was not surprising since both metHb and Hc accumulate as the bloodstain ages, and have been known to contribute to a high fluorescence background (Dasgupta et al., "Hemoglobin Degradation in Human Erythrocytes with Long-Duration Near-Infrared Laser Exposure in Raman Optical Tweezers," J. Biomed. Opt. 15(5):055009-11 (2010), which is hereby incorporated by reference in its entirety). Also, as previously determined with 785 nm excitation, the increasing fluorescence component results from heme aggregation and is related to changes in the electronic structure (Lemler et al., "NIR Raman Spectra of Whole Human Blood: Effects of Laser-Induced and In Vitro Hemoglobin Denaturation," Anal. Bioanal. Chem. 406(1):193-200 (2014), which is hereby incorporated by reference in its entirety). To compare the fluorescence increase over time, the averaged raw spectra for selected time points were compared (FIG. 1A). The absolute intensity of a low-frequency band in the spectra (400.5 cm$^{-1}$) for selected time points is displayed in FIG. 1B, fit with an exponential trendline. As shown, the fluorescence intensity profile increased with each subsequent time point. This line fitted well to the data with a high $R^2$ value of 0.97. Although it seems that this trend will continue long after one week, using only the fluorescence background intensity values as a way to predict the TSD of a bloodstain was not practical, especially because many substrates will contribute to the fluorescence profile. Therefore, more in-depth data analysis was implemented.

Figure 2:
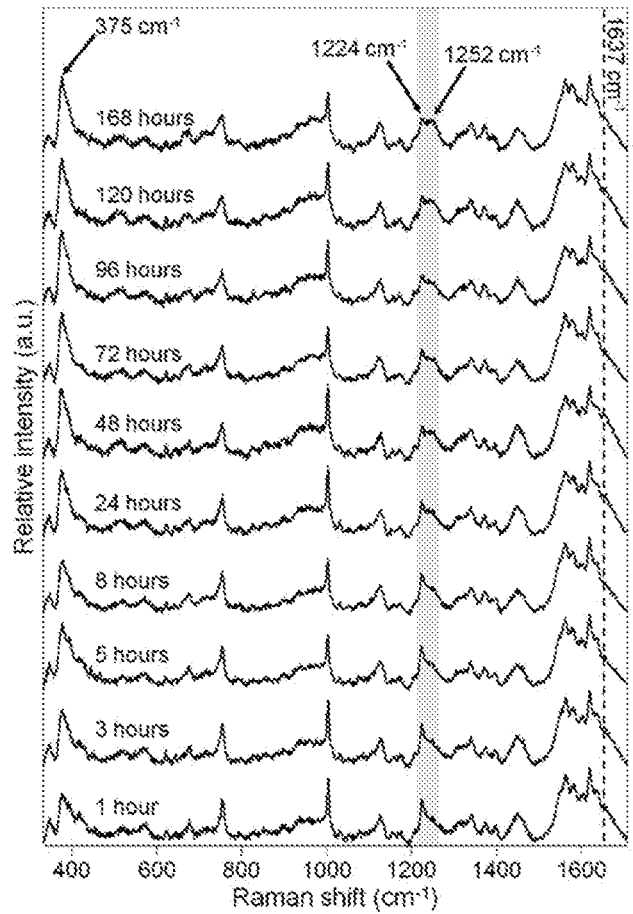
FIG. 2 is a graph showing the averaged preprocessed (baselined and normalized) Raman spectra of neat blood on aluminum foil collected at various time points. The dotted line and arrows indicate Raman bands where the most visible changes occur over time. The gray shaded area shows the spectral region used for 2D spectroscopic correlation analysis.

Spectra from each time point surveyed were baseline corrected by a 6th order automatic weighted least squares polynomial and normalized by total area. The averaged preprocessed spectra are shown in FIG. 2. From visual inspection of this dataset there appears to be several spectral features that change as the bloodstain ages. In order to investigate time-dependent changes of blood more closely, the intensity trends of dynamic Raman features (1637, 1252, 1224, and 377 cm$^{-1}$) were compared. Of those surveyed, the feature that changed in intensity earliest was the 377 cm$^{-1}$ band, which has previously been identified as a metHb marker (Premasiri et al., "Surface-Enhanced Raman Scattering of Whole Human Blood, Blood Plasma, and Red Blood Cells: Cellular Processes and Bioanalytical Sensing," J. Phys. Chem. B 116(31):9376-86 (2012); Lemler et al., "NIR Raman Spectra of Whole Human Blood: Effects of Laser-Induced and In Vitro Hemoglobin Denaturation," Anal. Bioanal. Chem. 406(1):193-200 (2014), which are hereby incorporated by reference in their entirety). The fact that all spectra contained this peak, which was much higher in intensity than the 420 cm$^{-1}$ band (an oxyHb marker), demonstrated that the autoxidation process of oxyHb conversion into metHb had already begun, even after 1 hour. As time progressed, the relative increase in the 377 cm$^{-1}$ band and decrease in the 420 cm$^{-1}$ band indicated the increasing and decreasing amounts of metHb and oxyHb, respectively. This is supported by the known fact that outside of the body oxyHb is naturally autoxidized, forming metHb, and cannot be converted back due to the lack of cytochrome-b5 reductase.

It has been also shown that the band at 1252 cm$^{-1}$ increases, while the bands at 1637 cm$^{-1}$ and 1224 cm$^{-1}$ decrease, with higher temperature (Wood et al., "Raman Microspectroscopy and Imaging Provides Insights into Heme Aggregation and Denaturation within Human Erythrocytes," J. Biomed. Opt. 10(1):014005-01400513 (2005), which is hereby incorporated by reference in its entirety). In addition, it has been shown that the 1224 cm$^{-1}$ band is lower in relative intensity for metHb samples as compared to oxyHb samples, and decreases over time as does the $O_2$ marker band at 1637 cm$^{-1}$ (Lemler et al., "NIR Raman Spectra of Whole Human Blood: Effects of Laser-Induced and In Vitro Hemoglobin Denaturation," Anal. Bioanal. Chem. 406(1):193-200 (2014), which is hereby incorporated by reference in its entirety). The same trends were observed for these bands in spectra over time, while the temperature remained constant. Also, the trends do not appear to plateau in the logarithmic time scale, suggesting that the process will continue even after 168 hours; supported in part by literature (Lemler et al., "NIR Raman Spectra of Whole Human Blood: Effects of Laser-Induced and In Vitro Hemoglobin Denaturation," *Anal. Bioanal. Chem.* 406(1):193-200 (2014), which is hereby incorporated by reference in its entirety). These results were in line with the observation that a hemoglobin denaturing process, which can be induced with high or continuous laser exposure or temperature (Lemler et al., "NIR Raman Spectra of Whole Human Blood: Effects of Laser-Induced and In Vitro Hemoglobin Denaturation," *Anal. Bioanal. Chem.* 406(1):193-200 (2014); Lemler et al., "NIR Raman Spectra of Whole Human Blood: Effects of Laser-Induced and In Vitro Hemoglobin Denaturation," *Anal. Bioanal. Chem.* 406(1):193-200 (2014), which are hereby incorporated by reference in their entirety), is also naturally occurring for blood stored in ambient conditions over time. Furthermore, these findings helped to prove that the process of natural degradation is immediate and can be probed on the scale of hours as well as over longer periods of time.

Two-Dimensional Correlation Spectroscopy (2D CoS) Analysis

Figure 3:
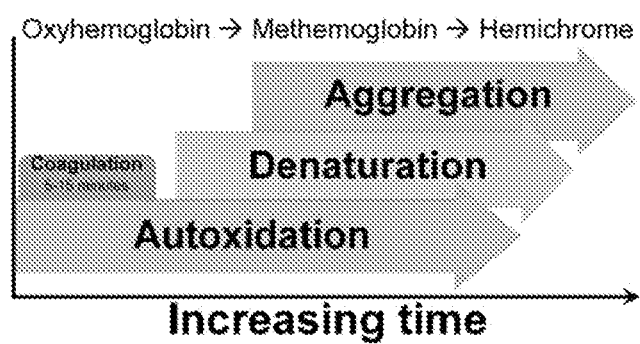
FIG. 3 is a scheme demonstrating the order of changes occurring naturally to a bloodstain as time progresses.

The relationship between changes in time-dependent peaks from spectra of a bloodstain as it ages can be elucidated by 2D CoS. From this analysis, different relationships could be elucidated to help determine the relative age of bloodstains. Over time, there is a color change in bloodstains and certain peaks are known to decrease or increase. By analyzing spectra with 2D CoS, information about whether spectral changes are correlated can be obtained. More importantly, the order of chemical changes in bloodstains, specifically related to Hb for Raman spectra of dried blood, can be interpreted and/or confirmed. This is essential for providing a more robust analysis of the kinetic changes in the spectral data and associating these changes to those occurring naturally. As a more illustrative way to demonstrate what occurs to bloodstains, and Hb in particular, a scheme has been generated (FIG. 3). This scheme provides an overview of the processes involved in Hb aging outside of the body as time progresses for which 2D CoS analysis can be used to investigate.

Figure 4A:
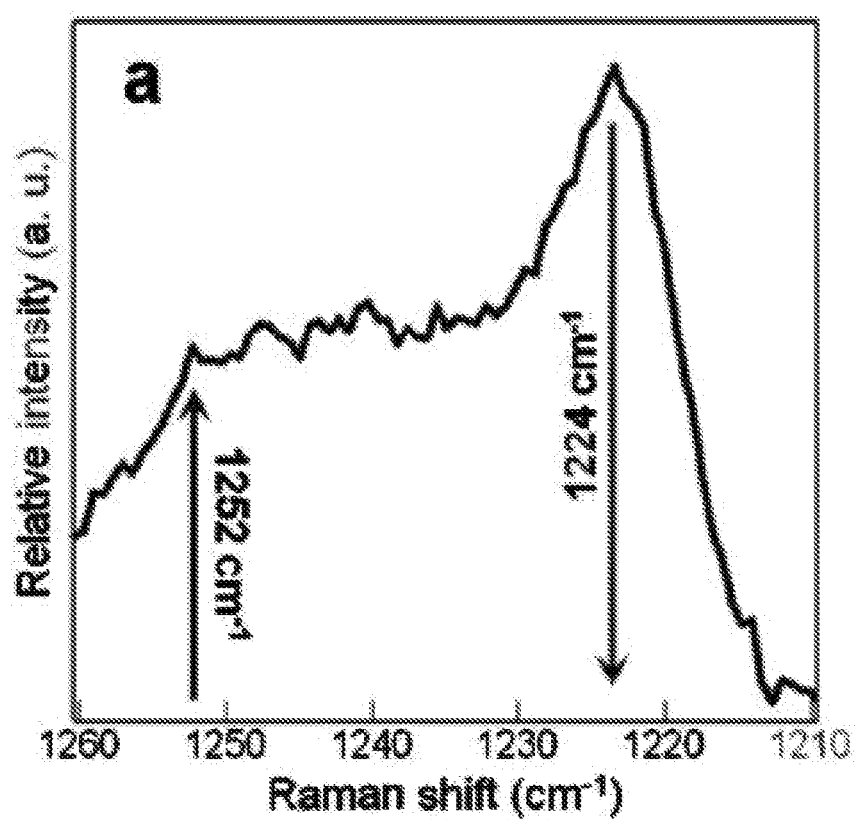
FIGS. 4A-C are graphs showing preprocessed averaged spectral region (1210-1260 cm$^{-1}$) used for 2D correlation analysis (FIG. 4A) along with the synchronous (FIG. 4B) and asynchronous 2D (FIG. 4C) correlation maps generated. The arrows are indicating the overall changes in the peaks over time.

Natural changes over time in the spectral region 1210-1260 $cm^{-1}$ (FIG. 2 shaded area) have not yet been clearly explained, so 2D CoS was used to help interpret those dynamic changes occurring due to aging. The preprocessed averaged (by time point) spectra were analyzed using 2D CoS, and the main correlation for this region as time progressed was an increase in the band at 1252 $cm^{-1}$ while the 1224 $cm^{-1}$ band diminished. These two peaks are part of the amide III spectral region and have tentatively been assigned to random coil and β-sheet, respectively (Rygula et al., "Raman Spectroscopy of Proteins: A Review," *J. Raman Spectrosc.* 44(8):1061-76 (2013), which is hereby incorporated by reference in its entirety). More specifically, for whole blood, the peak at 1224 $cm^{-1}$ is known to decrease as oxyHb autoxidizes to form metHb (Lemler et al., "NIR Raman Spectra of Whole Human Blood: Effects of Laser-Induced and In Vitro Hemoglobin Denaturation," *Anal. Bioanal. Chem.* 406(1):193-200 (2014), which is hereby incorporated by reference in its entirety). This kinetic change is denoted by the corresponding arrows for the two peaks in the portion of the preprocessed averaged (all time points) blood spectrum shown in FIG. 4A.

Figure 4B:
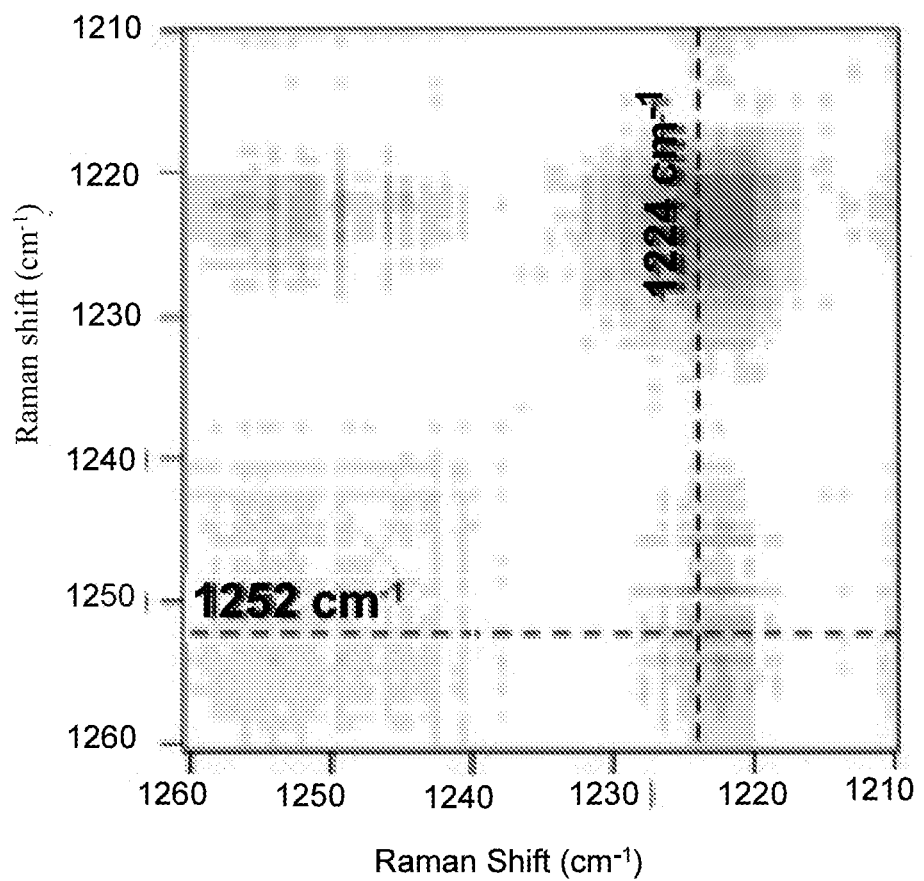
Figure 4C:
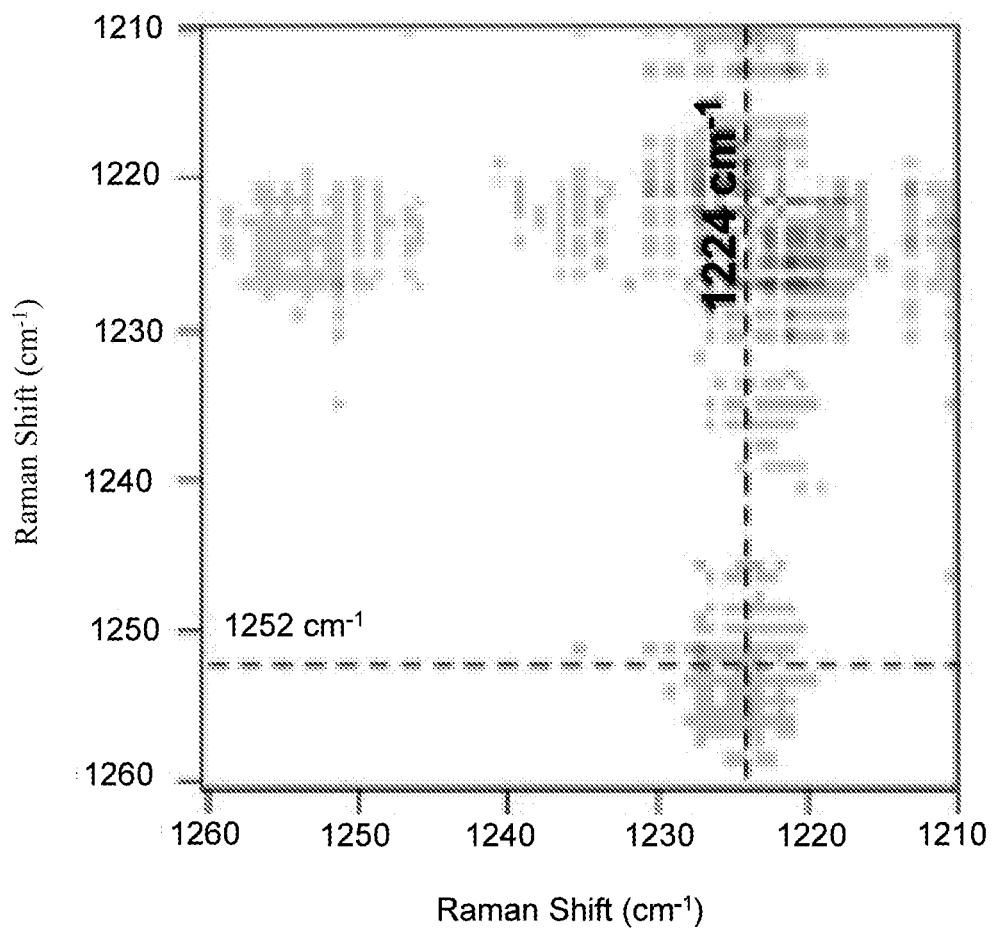

For 2D CoS analysis, two types of plots (i.e. synchronous and asynchronous) were generated. Synchronous plots provided information about the relative correlation (i.e. positive=change in same direction; negative=change in opposite directions) between peaks over time, whereas asynchronous plots were used to determine the sequence of those kinetic changes. The synchronous and asynchronous plots for the aforementioned spectral region are displayed in FIGS. 4B and 4C, respectively. The negative (blue) feature on the synchronous plot (FIG. 4B) confirms the negative correlation seen visually between the peaks located at 1252 $cm^{-1}$ and 1224 $cm^{-1}$. This cross-peak also has a negative feature on the asynchronous plot (FIG. 4C). According to Noda's rules (Noda et al., "Two-Dimensional Correlation Spectroscopy: Applications in Vibrational and Optical Spectroscopy," John Wiley & Sons, Inc.:Hoboken, N.J. (2004), which is hereby incorporated by reference in its entirety), when the sign of the cross-peak is the same for both synchronous and asynchronous plots, the change first begins with the band on the x-axis (decrease of the 1224 $cm^{-1}$ band) followed by a change with the band on the y-axis (increase of the 1252 $cm^{-1}$ band). It is to be expected that, over time, the amount of β-sheet (1224 $cm^{-1}$) content would decrease as Hb denatures, while the amount of random coil (1252 $cm^{-1}$) content would increase as aggregation occurs. Based on these 2D CoS results and what is known about Hb aging outside of the body, this correlation helped to support the conclusion that the process of natural Hb denaturation is occurring before aggregation, as demonstrated in FIG. 3.

Statistical Analyses

Statistical analysis was performed on the kinetic blood data to ascertain two key pieces of information: first, to determine if all spectra could be identified as blood for each time point, and second, to build a predictive model for extrapolating the TSD of all bloodstains. To identify a spectrum as blood, comparisons were made between experimentally measured spectra and reconstructed spectra for each time point. As previously stated, reconstructed spectra were obtained using multidimensional Raman spectroscopic signatures of blood (McLaughlin et al., "A Modified Raman Multidimensional Spectroscopic Signature of Blood to Account for the Effect of Laser Power," *Forensic Sci. Int* 240: 88-94 (2014), which is hereby incorporated by reference in its entirety), saliva (Virkler et al., "Forensic Body Fluid Identification: The Raman Spectroscopic Signature of Saliva," *Analyst* 135(3):512-7 (2010), which is hereby incorporated by reference in its entirety), semen (Virkler et al., "Raman Spectroscopic Signature of Semen and its Potential Application to Forensic Body Fluid Identification," *Forensic Sci. Int* 193(1-3):56-62 (2009), which is hereby incorporated by reference in its entirety), sweat (Sikirzhytski et al., "Multidimensional Raman Spectroscopic Signature of Sweat and its Potential Application to Forensic Body Fluid Identification," *Anal. Chim. Acta.* 718(0):78-83 (2012), which is hereby incorporated by reference in its entirety), and vaginal fluid (Sikirzhytskaya et al., "Raman Spectroscopic Signature of Vaginal Fluid and its Potential Application in Forensic Body Fluid Identification," *Forensic Sci. Int* 216(1-3):44-8 (2012), which is hereby incorporated by reference in its entirety). These spectra for the first (1 hour) and final (168 hours or 1 week) times points surveyed are shown in FIGS. 5A and 5B. It is evident that the spectrum reconstructed using the blood signature was most similar to the experimentally measured bloodstain spectrum, even at 1 week since deposition (FIG. 5B). The reconstructed spectra using the multidimensional spectroscopic signatures for all other body fluids considered do not contain the same number of peaks, nor peak locations, as those in the experimentally measured bloodstain spectra. More specifically, the spectra reconstructed using both the sweat and vaginal fluid signatures show no spectral information at all, even at 1 hour since deposition (FIG. 5A). Similar results were obtained for spectra of the second (female) bloodstain sample, allowing for correct blood identification up to one week as well.

In order to build a predictive model for TSD extrapolation, PLSR analysis was used with four latent variables (LVs); the default number obtained from the scree plot. This type of analysis utilizes derived components from the training data to describe the changes over time. An internally CV calibration curve for all time points analyzed is shown in FIG. 6A, where the time scale is in the log of hours and the green and red lines represent the best and actual fit, respectively. An ideal result for this plot is to have minimal spread within the spectra (symbols) for each time point and for all symbols to lie directly on the green line (line of best fit). There was some variation in the amount of spread between symbols, with the largest amount of spread at 1 hour and the smallest for the 24 hour spectra. The greatest amount of spread occurred for the 1 hour time point most probably because changes in bloodstains are most prominent and rapidly occurring during the earlier stages. However, the relative spread within each time point was sufficiently small such that a 'fresh' (1 hour) bloodstain can be easily distinguished from one 8 hours old, and from one that is 168 hours old. This distinction was a key finding of the study and very important as it pertains to forensics, which is to establish the relative association between multiple bloodstains in addition to determining if all bloodstains discovered are associated to the crime being investigated.

It is evident that the line of best fit (green line) matches well with the line of actual fit (red line) in FIG. 6A. Minor differences in fresh blood are to be expected, since variations will occur during spectral acquisition. Regardless of these differences, the prediction accuracy demonstrated by the PLSR model was high. The calibrated RMSE and $R^2$ values were 0.02 and 0.99, respectively, while the CV RMSE and R2 values were 0.13 and 0.97, respectively. For a more standardized representation of the error, the coefficient of variation (CoV) can be calculated (Bruin, J., "FAQ: What is the Coefficient of Variation?," *UCLA: Statistical Consulting Group* (2011) [Available from: www.ats.ucla.edu/stat/mult_pkg/faq/general/coefficient_of_variation.htm.], which is hereby incorporated by reference in its entirety) through dividing the RMSE by the mean of the dependent variable (prediction values) and then multiplying by 100 to obtain a percentage. The calibrated and CV CoV were 1.51% and 10.15%, respectively. These values indicate that the model has effective prediction accuracy and represents a good fit of the data. Furthermore, the CV CoV of 10.15% is comparable to values published previously using PLSR analysis to determine bloodstain age (Edelman et al., "Hyperspectral Imaging for Non-Contact Analysis of Forensic Traces," *Forensic Sci. Int* 223(1-3):28-39 (2012), which is hereby incorporated by reference in its entirety). However, in that study the same donor was used for external (test) predictions, which does not fully validate the model. The only difference between their calibration and test datasets was that a different colored fabric was used. Therefore, in order to test our PLSR model in a more robust manner, a dataset of external blood spectra, collected from a different donor than which was used to build the model, were loaded into the model to obtain external TSD predictions.

FIG. 6B shows the results of TSD predictions for the calibration (male donor used to build the model) and test (external female donor) blood spectra versus the actual (measured) TSD. It can be seen that nearly all of the calibration spectra (black circles) fell directly on the green line, indicating a high accuracy of TSD predictions. This is to be expected because these spectra were the same ones from the training dataset used to build the PLSR model. For TSD predictions of this calibration dataset, the RMSE of prediction (RMSEP) was 0.02, with an $R^2$ of 0.99. The external test blood spectra (red diamonds) demonstrated a lower accuracy of TSD prediction overall. The RMSEP of the test dataset was 0.34, or 2.19 hours, with an $R^2$ of 0.97. The CoV values for the calibration and test predictions were 1.69% and 21.62%, respectively. After about 24 hours, the ability to accurately predict the TSD of the external bloodstains decreased. From 48 hours onward the external TSD predictions were all higher than the TSD predictions for the calibration dataset. For all but two of the time points (i.e. 48 and 72 hours) the estimated error of the test dataset overlapped with that of the calibration dataset. These results showed promise for the estimation of the TSD for bloodstains using Raman spectroscopy with advanced statistical methods. Furthermore, enough spectral variation exists between bloodstains of different ages in order to establish trends over time and distinguish between 'recent' (1 hour) and 'older' (1 week) bloodstains.

Conclusions

Fresh human peripheral blood was analyzed for up to one week using Raman microspectroscopy. Specific kinetic spectral trends were identified that inferred hemoglobin denaturation followed by aggregation (Lemler et al., "NIR Raman Spectra of Whole Human Blood: Effects of Laser-Induced and In Vitro Hemoglobin Denaturation," *Anal. Bioanal. Chem.* 406(1):193-200 (2014); Dasgupta et al., "Hemoglobin Degradation in Human Erythrocytes with Long-Duration Near-Infrared Laser Exposure in Raman Optical Tweezers," *J. Biomed. Opt.* 15(5):055009-11 (2010), which are hereby incorporated by reference in their entirety). This observation was supported through 2D correlation spectroscopic analysis for a region where the spectral changes were not previously well-described. Using multi-dimensional spectroscopic signature comparisons of blood, saliva, semen, sweat, and vaginal fluid, all experimentally measured spectra for both donors were confirmed to be blood, and not a different body fluid, at all time points. The PLSR model indicated remarkable results for predicting the TSD of bloodstains, with slightly lower accuracy for external validation. TSD predictions of a bloodstain were shown using a different donor than which was used for the training dataset, obtaining a RMSEP of 0.34 (CoV=21.62%). Although this value is slightly higher than twice that of our RMSECV for internal predictions, the $R^2$ of 0.97 demonstrates a very good overall fit for the external dataset.

Furthermore, it was established that fresh (up to 24 hours old) bloodstains can be easily discriminated from bloodstains that are days old. This work demonstrates the present approach to expand upon the most currently published work of investigating the kinetic effects of natural aging of bloodstains, using Raman spectroscopy, by incorporating 2D CoS and PLSR analyses for the identification of specific kinetic trends and quantitative predictions of the TSD. More importantly, the present application shows the ability to not only confirm the identity of a stain as blood for up to one week, but also accurately predict the TSD of that bloodstain all using the same spectral dataset. These findings have immediate practical use for the field of forensic science. The donors used in the current study are only representative of a portion of the general population and it is conceivable that these factors (especially blood thinning medication) could affect the accuracy of TSD estimations. In order to investigate if the trends shown here differ for bloodstains stored in other environments and on various substrates, the same approach needs to be applied to explore the potential effect of the substrate and changes in temperature, humidity, and exposure to sunlight.

Example 5—Sample Preparation for Examples 6-7

Approximately 30 μL of fresh human blood was procured from a cleaned finger pricked using a lancet, following the protocol approved by the University at Albany Institutional Review Board (IRB). These blood samples were collected from one male donor for each of the four environments (and one female donor for room temperature only). The blood was placed on aluminum foil covered microscope slides and allowed to dry. The RT blood samples were stored on a lab bench in a partially covered petri dish. The samples stored at increased (32° C.) and decreased (4° C.) temperatures were stored in temperature-regulated rooms. The samples stored at High Humidity (80%) (HH) were stored in humidity-controlled chambers on a lab bench. Raman mapping measurements were performed on the bloodstains for the following time points:
    RT: 1, 3, 5, 8, 24, 48, 72, 96, 120, 168, 336, 672, and 8760 hours
    32° C.: 1, 3, 5, 8, 24, 48, 72, 96, 120, 168, 336, 4392, and 6480 hours
    4° C.: 1, 3, 5, 8, 24, 48, 72, 96, 120, 144, 168, 336, 720, 4344, and 6552 hours
    HH: 1, 3, 5, 8, 24, 48, 72, 96, 120, 144, 168, 336, and 720 hours All samples were analyzed within 15 minutes of the designated time point using a Horiba LabRAM HR Evolution Raman microscope. A 785 nm excitation source was used to irradiate the sample ten times, each for 15 seconds, using a 50× long working distance objective at 50% laser power (~5 mW). After calibration using a silicon standard, Raman mapping was utilized for spectral collection at a total of nine different spots on each bloodstain for each time point, over the spectral range 300-1800 $cm^{-1}$.

Example 6—Analytical Work

All spectra were imported into MATLAB (MathWorks, Inc.; version R2013a) with the PLS toolbox (Eigenvector Research, Inc.; version 7.9.3) for data treatment and statistical analysis. Each spectrum was preprocessed by baseline correction using a 6th order polynomial and normalized by total area before performing 2D correlation spectroscopy (2D CoS) analysis. Additionally, all spectra were mean-centered before building any regression models.

2D CoS analysis was performed on preprocessed averaged RT spectra at specific time points (i.e. 1, 3, 5, 8, 24, 48, 72, 96, 120, and 168 hours). "2D shige" software (version 1.3) was used to produce synchronous and asynchronous correlation plots for the spectral region 1210-1260 $cm^{-1}$, where visual changes over time were prominent but have not yet been clearly explained in literature.

Linear regression models were built using partial least squares (PLS) calculated with the statistically inspired modification of PLS (SIMPLS) algorithm on preprocessed spectra, categorized according to time point, to determine the approximate age of the bloodstain. Since the trend for the age of a bloodstain is not linear, a $log_{10}$ scale for each time point was used to fit the data. All PLSR models were internally cross-validated using the venetian blinds method with 10 splits. The PLSR models for blood stored at room temperature were also externally validated with a new dataset of blood spectra from a completely different donor than that used to build the model.

Example 7—Results and Conclusions of Examples 5-6

Kinetic experiments using freshly drawn human blood have been carried out. Bloodstains have been stored in four different environments. The length of time bloodstains have been kept in these environments varied from up to 1 month (HH), to as long as 1 year (RT). For each of these environments, Raman spectroscopic mapping was used to collect spectra from multiple spots on the bloodstain at each time point. Variations in the spectra were considered and regression analysis was used to predict the age, or TSD, of the bloodstains. Detailed results for bloodstains stored in the four individual environments studied can be found below.

Room Temperature (RT)

Figure 7:
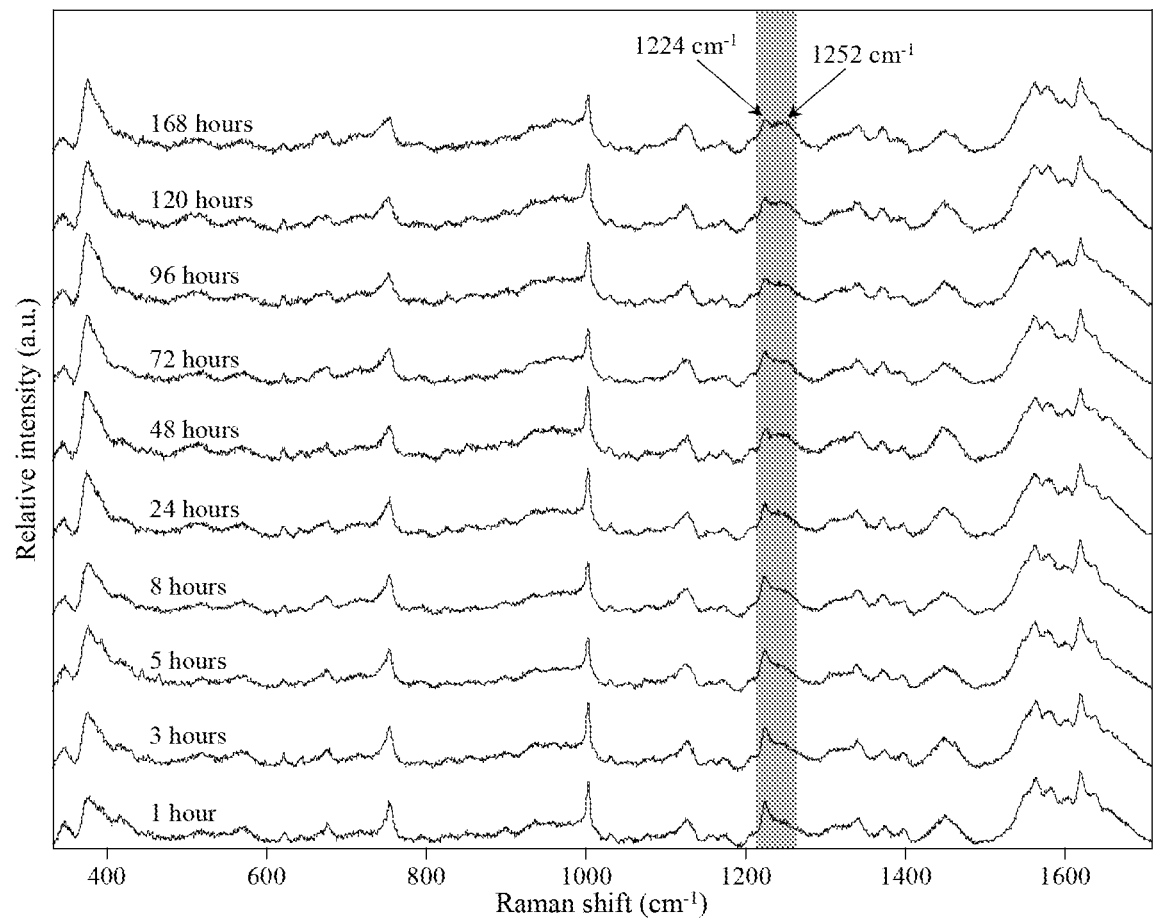
FIG. 7 is a graph showing the averaged preprocessed (baselined and normalized) Raman spectra of neat blood on aluminum foil collected at various time points. The arrows indicate Raman bands where visible changes occur over time. The gray shaded area shows the spectral region used for 2D spectroscopic correlation analysis.

Raman maps, consisting of nine points each, were accumulated on freshly drawn human blood, without preservatives or anti-coagulants, from one male and one female donor stored in ambient (room temperature) conditions at thirteen time points between 1-8760 hours (1 year). Significant changes were noticed for spectra up to 1 week and therefore more in-depth data analysis was carried out for this time frame. FIG. 7 shows the preprocessed (baseline corrected and normalized) averaged spectra up to 168 hours (1 week) for bloodstains from the male donor. It is evident from these spectra that certain peaks were changing in intensity over time. It is known that the peaks at 375 $cm^{-1}$ and 420 $cm^{-1}$, previously assigned as markers for met-hemoglobin (metHb) and oxy-hemoglobin (oxyHb), respectively, will change over time; the peak at 375 $cm^{-1}$ increases while the peak at 420 $cm^{-1}$ decreases. Additionally, two peaks (1252 $cm^{-1}$ and 1224 $cm^{-1}$) in part of the amide III region also changed with time but the reasoning has not yet been explained in detail. Therefore, 2D CoS was used to help interpret those dynamic changes occurring due to bloodstain aging.

Figure 8A:
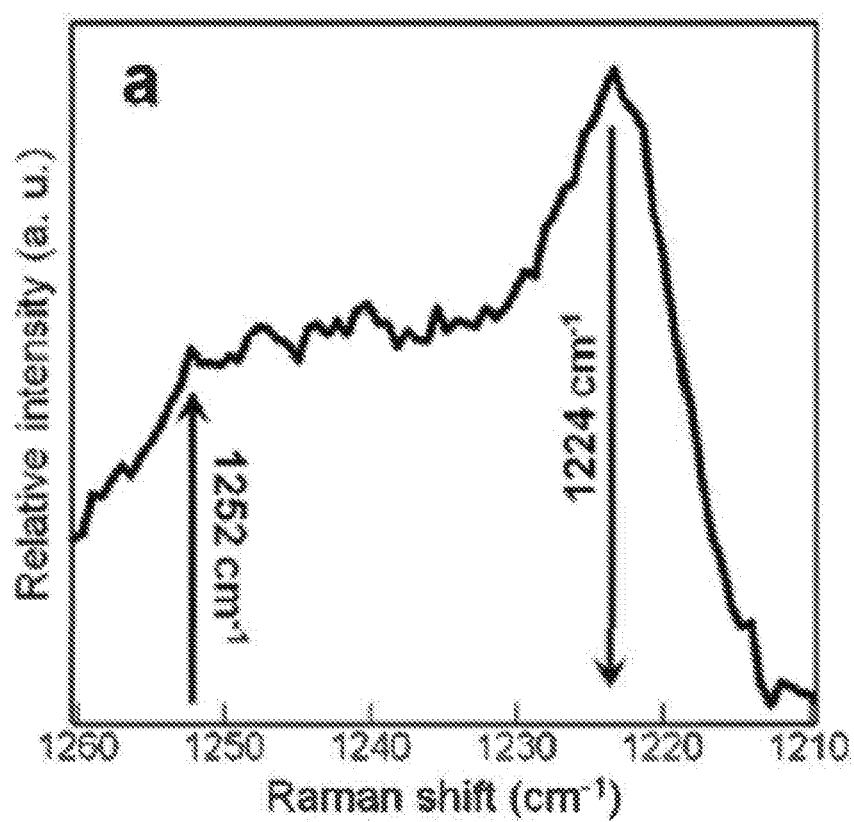
FIGS. 8A-C are graphs showing the preprocessed averaged spectral region (1210-1260 cm$^{-1}$) used for 2D CoS analysis (FIG. 8A) along with the synchronous (FIG. 8B) and asynchronous (FIG. 8C) 2D CoS maps generated. The arrows are indicating the overall changes in the peaks over time.

The preprocessed averaged (by time point) spectra were analyzed using 2D CoS, to determine if the changes over time in the peaks at 1252 $cm^{-1}$ and 1224 $cm^{-1}$, which increased and decreased, respectively, were somehow related. These two peaks have tentatively been assigned to random coil (1252 $cm^{-1}$) and β-sheet (1224 $cm^{-1}$). For whole blood in particular, the peak at 1224 $cm^{-1}$ is known to decrease as oxyHB autoxidizes to form metHb. This kinetic change is denoted by the corresponding arrows for the two peaks in the portion of the preprocessed averaged (all time points up to 168 hours) blood spectrum shown in FIG. 8A.

Figure 8B:
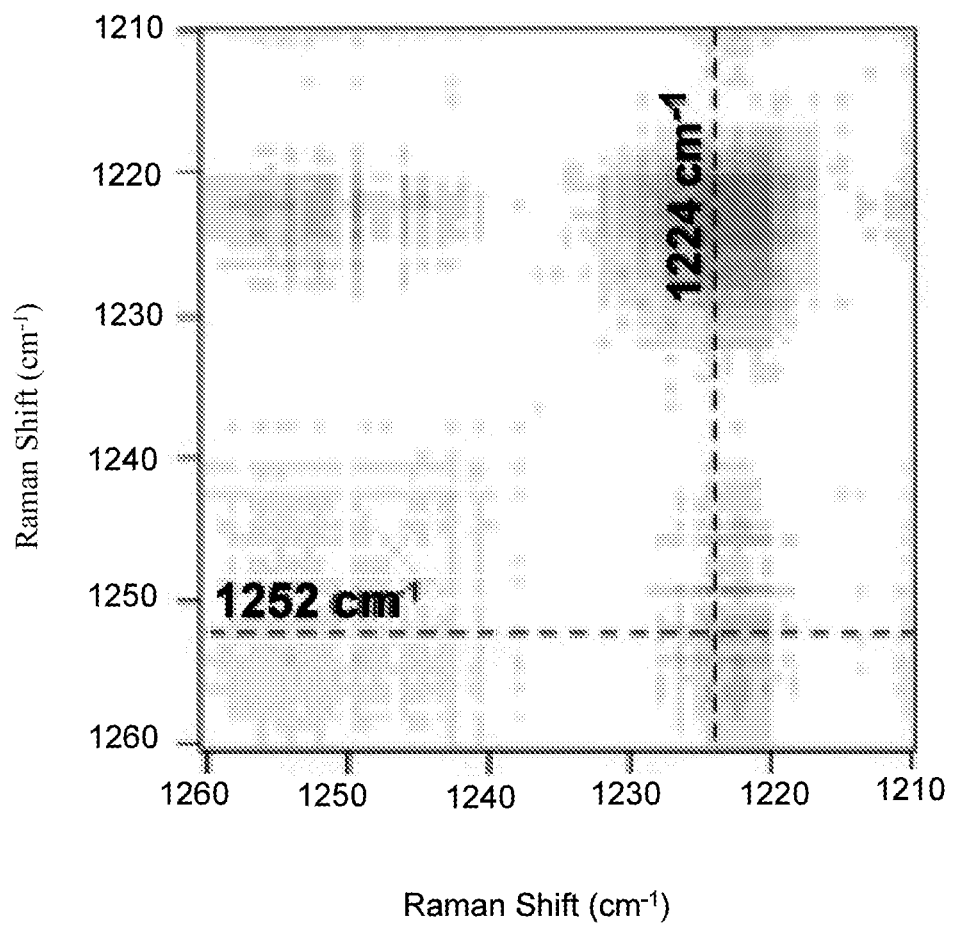
Figure 8C:
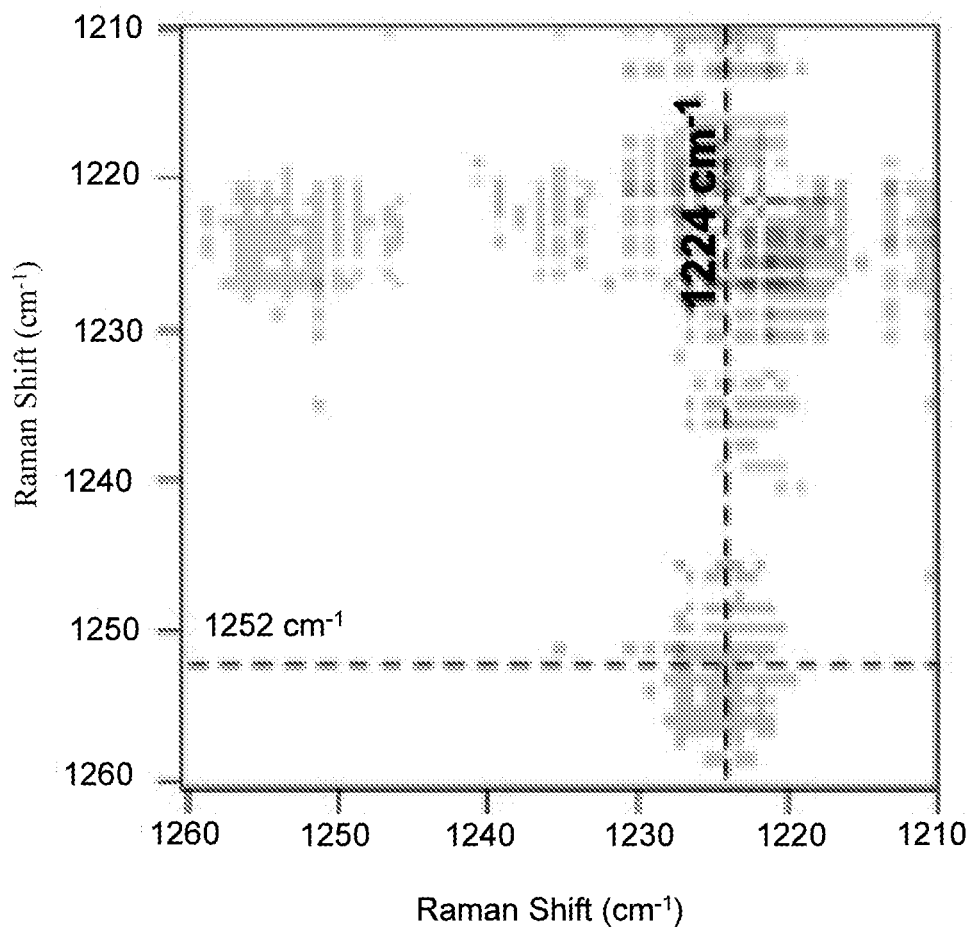

To show the relationship between peaks for 2D CoS analysis, synchronous and asynchronous plots were generated. Synchronous plots provided information about the relative correlation (i.e. positive=change in same direction; negative=change in opposite directions) between peaks over time, whereas asynchronous plots were used to determine the sequence of those kinetic changes. The synchronous and asynchronous plots for the aforementioned spectral region are displayed in FIGS. 8B and 8C, respectively. The negative (blue) feature on the synchronous plot (FIG. 8B) confirmed the negative correlation seen visually between the peaks located at 1252 $cm^{-1}$ and 1224 $cm^{-1}$. This cross-peak also has a negative feature on the asynchronous plot (FIG. 8C). According to Noda's rules, when the sign of the cross-peak is the same for both synchronous and asynchronous plots, the change first begins with the band plotted on the x-axis (decrease of the 1224 cm$^{-1}$ band) followed by a change with the band plotted on the y-axis (increase of the 1252 cm$^{-1}$ band). It is to be expected that, over time, the amount of β-sheet (1224 cm$^{-1}$) content would decrease as Hb denatures, while the amount of random coil (1252 cm$^{-1}$) content would increase as aggregation occurs. Based on these 2D CoS results, and what is known about Hb aging outside of the body, this correlation helps to support the conclusion that the process of natural Hb denaturation is occurring before aggregation.

Figure 9:
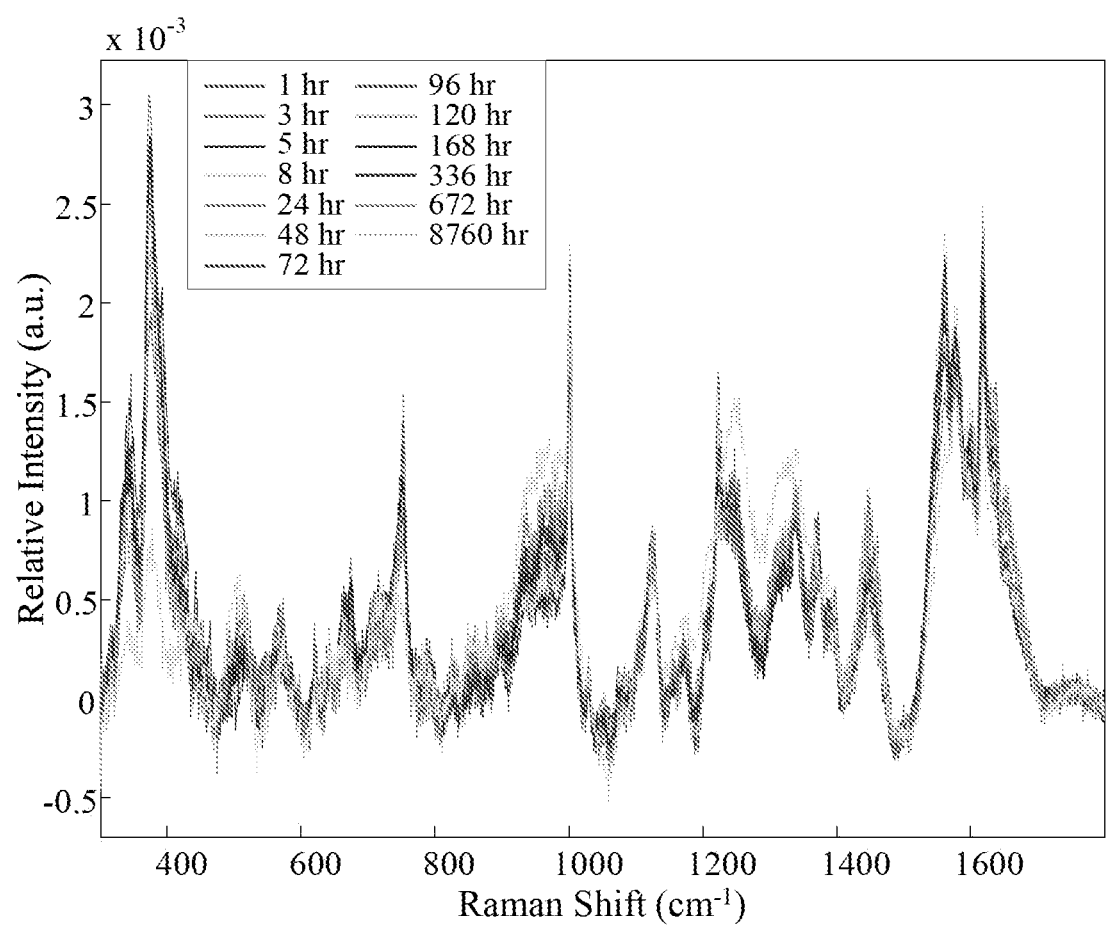
FIG. 9 is a graph showing the averaged preprocessed spectra for bloodstains (from a male donor) stored at room temperature environment for up to 8760 hours (1 year).

After 1 week, changes in the blood spectra between time points were more subtle until the final (1 year) time point. FIG. 9 shows the preprocessed (baseline corrected and normalized) averaged spectra up to 8760 hours (1 year) for bloodstains from the male donor. The relative intensity for the spectral region 250-450 cm$^{-1}$ is much lower for the 8760 hour spectra than all other time points. This is in contrast of what would be expected and is not in line with the overall trend occurring for the previous time points. A possible explanation for this is that at such a relatively old age, the bloodstain may have started to degrade causing this change. In effect, normalization by total area makes these peaks lower in relative intensity whereas others are higher in regions where it would not be expected.

To determine the ability for predicting the TSD of bloodstains stored at room temperature, a PLSR model was built using the male donor's bloodstain spectra from all thirteen time points. The PLSR model was built using three latent variables (LVs) and externally validated using bloodstain spectra collected at the same time points from a separate (female) donor. The root mean squared error of calibration (RMSEC), RMSECV, the calibrated R$^2$, and the R$^2$CV values can be found below in Table 1. These values demonstrate how well the model works for predicting the age of bloodstains since the R$^2$ values are high and the RMSE values are low.

TABLE 1

Statistical metrics for the PLSR model built with male blood spectra up to 8760 hours (1 year)

| RMSEC | RMSECV | R$^2$ calibrated | R$^2$ CV |
| --- | --- | --- | --- |
| 0.12 | 0.17 | 0.99 | 0.97 |

Figure 10:
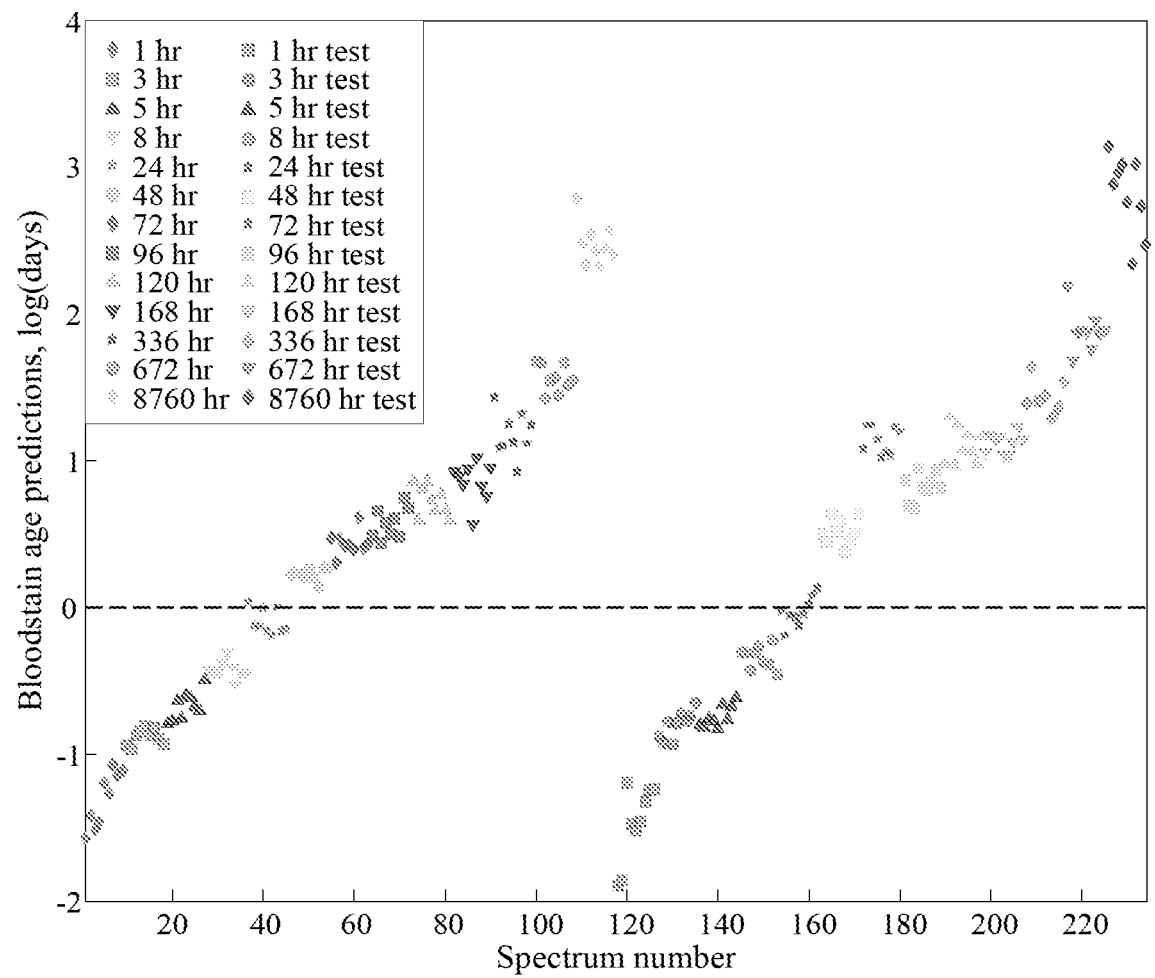
FIG. 10 is a graph showing the prediction scores for the PLSR model built from male bloodstain spectra (plotted on the left-hand side) with bloodstain spectra from the female donor as external (test) predictions (plotted on the right-hand side).

In order to truly test the performance of the PLSR model, external validation was required. For this step, the spectral dataset collected from the female bloodstain sample was loaded into the PLSR model built using the dataset collected from the male bloodstain sample. FIG. 10 shows the prediction results for the PLSR model built using blood spectra from the male donor and external predictions for the female donor.

Figure 11:
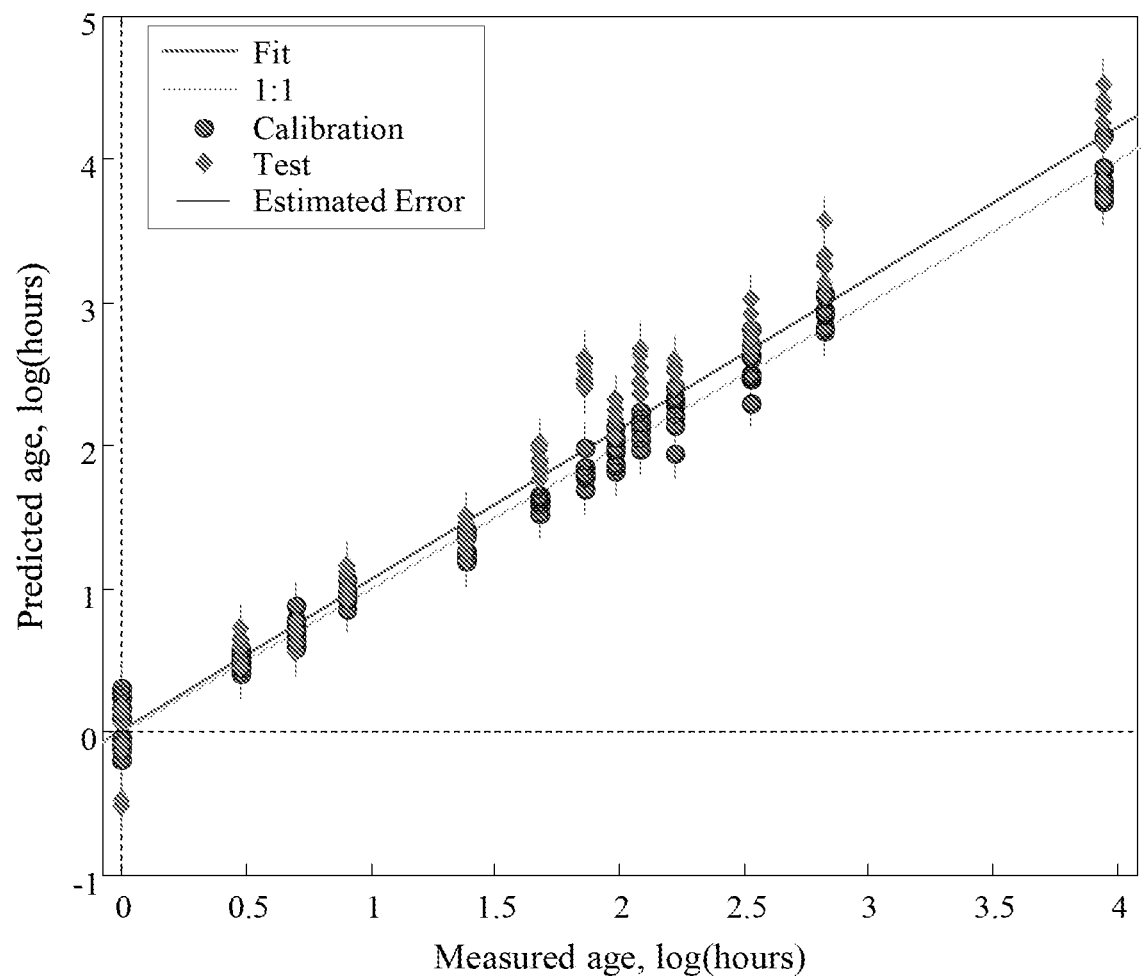
FIG. 11 is a graph showing predicted versus measured (actual) bloodstain age values for the regression model built using spectra from bloodstains stored at room temperature. The PLSR model was built using a male donor's blood spectra and tested with a female donor's blood spectra. Grey lines for each symbol show the estimated error.

For this plot, the ideal result would be to have (nearly) identical prediction scores for both the internal (male) and external (female) spectra at every time point. It is visible from FIG. 10 that the predictions follow a similar trend, but the accuracy of the prediction scores varies. To look more specifically at these variances, and how the model performed overall, the scores for predicted vs. measured (actual) bloodstain age were plotted in FIG. 11 for both the calibration (male) and test (female) spectra. From this figure, one trend worth mentioning is that starting at 48 hours most of the age prediction scores for the test (red diamonds) spectra were above the age prediction scores for the calibration (grey circles) spectra. The root mean squared error of prediction (RMSEP) was 0.32 with an R$^2$ of 0.97, demonstrating a good fit and ability for the model to accurately predict the age of the bloodstain, even for completely external (unknown) bloodstain samples.

Increased Temperature (32° C.)

Figure 12:
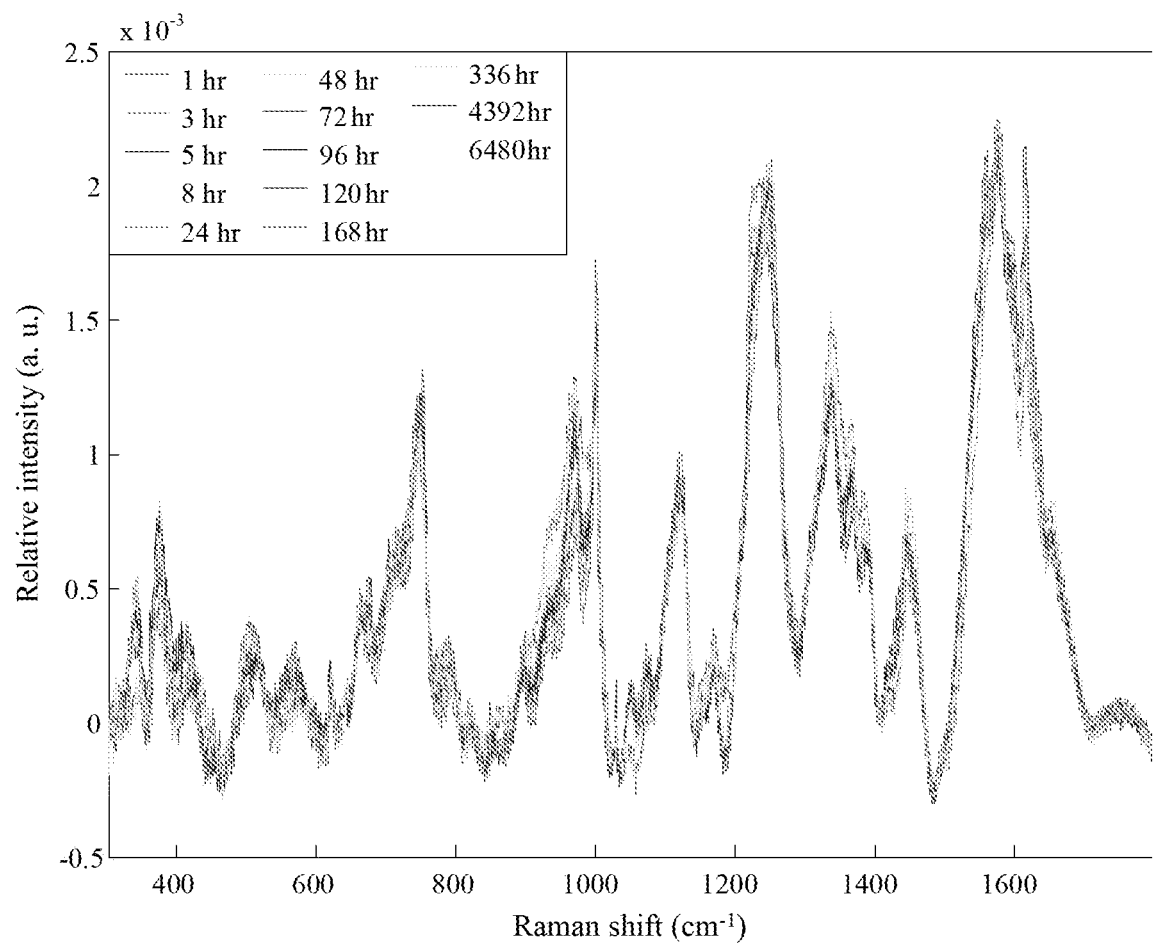
FIG. 12 is a graph showing the averaged preprocessed spectra for bloodstains stored in a warm (32° C.) temperature-controlled environment for up to 6480 hours (~9 months).

Raman maps, consisting of nine points each, were accumulated on freshly drawn human (male) blood, without preservatives or anti-coagulants, stored in warm temperature (32° C.) conditions at thirteen time points between 1-6480 hours (~9 months). FIG. 12 shows the preprocessed (baseline corrected and normalized) averaged spectra for all time points measured up to 6480 hours. As can be seen from this figure, the spectra do not seem to change as much in comparison to those measured for blood stored at RT. The major changes occurred in the region from 300-400 cm$^{-1}$. This is to be expected since peaks in this region have been assigned to metHb, a form of hemoglobin that develops as a result of complete oxidation of hemoglobin. The band at 1640 cm$^{-1}$ seemed to show minor changes over time. This band has been assigned as an O$_2$ marker. Also, the region 900-950 cm$^{-1}$ seemed to show some deformation at the later time points.

Figure 13:
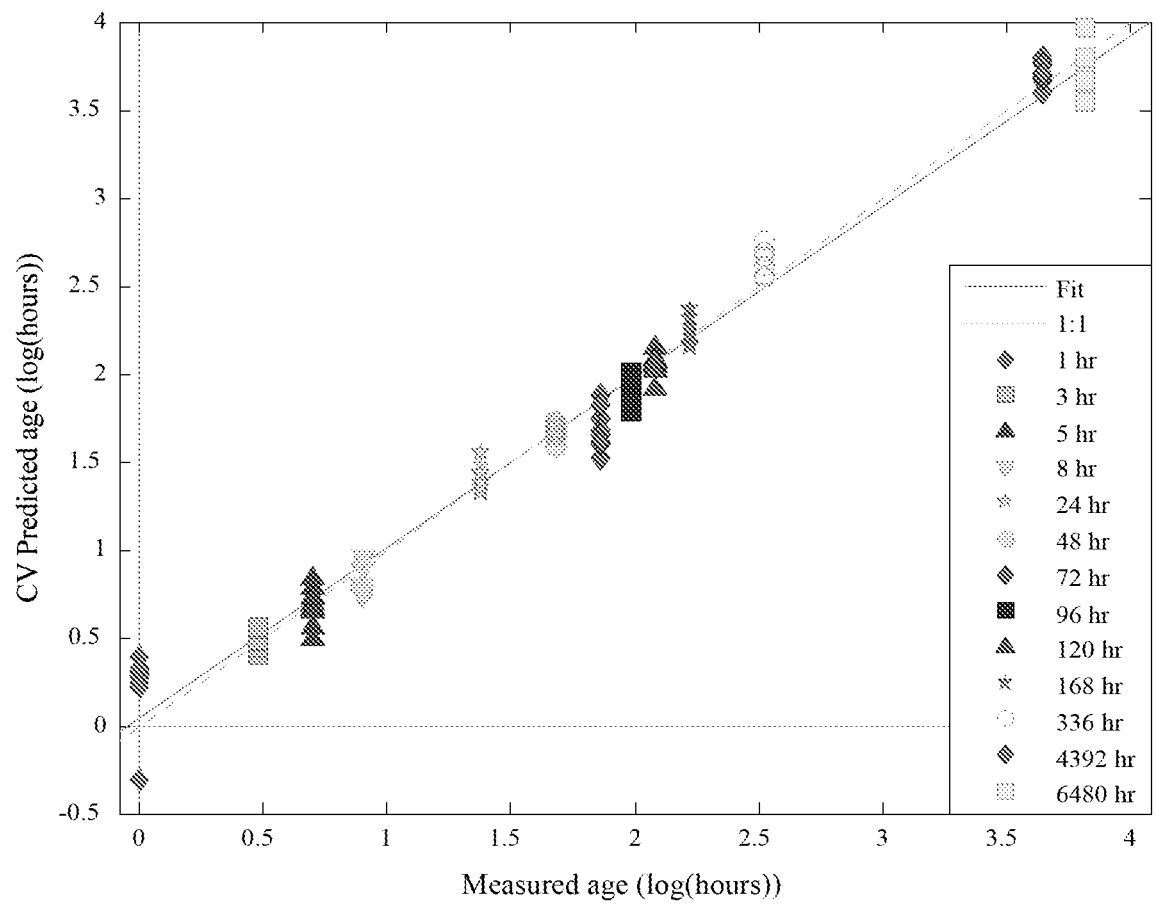
FIG. 13 is a graph showing the cross-validated (CV) age prediction values versus measured (actual) age values for the regression model built using spectra from bloodstains stored in a warm (32° C.) temperature-controlled environment for up to 6480 hours (~9 months).

In order to predict the age of the bloodstains stored in a warm (32° C.) temperature-controlled environment over time, a PLSR model was constructed using 4 LVs. FIG. 13 shows the CV results for predicting the age of the bloodstains stored at 32° C. for up to 6480 hours (~9 months). From this figure there seems to be one outlier, which is the first measurement in the map of blood stored for only 1 hour. However, this did not seem to negatively affect the prediction results, as demonstrated by the excellent fit, based on the low RMSECV and high R$^2$CV values of 0.13 and 0.99, respectively.

Decreased Temperature (4° C.)

Figure 14:
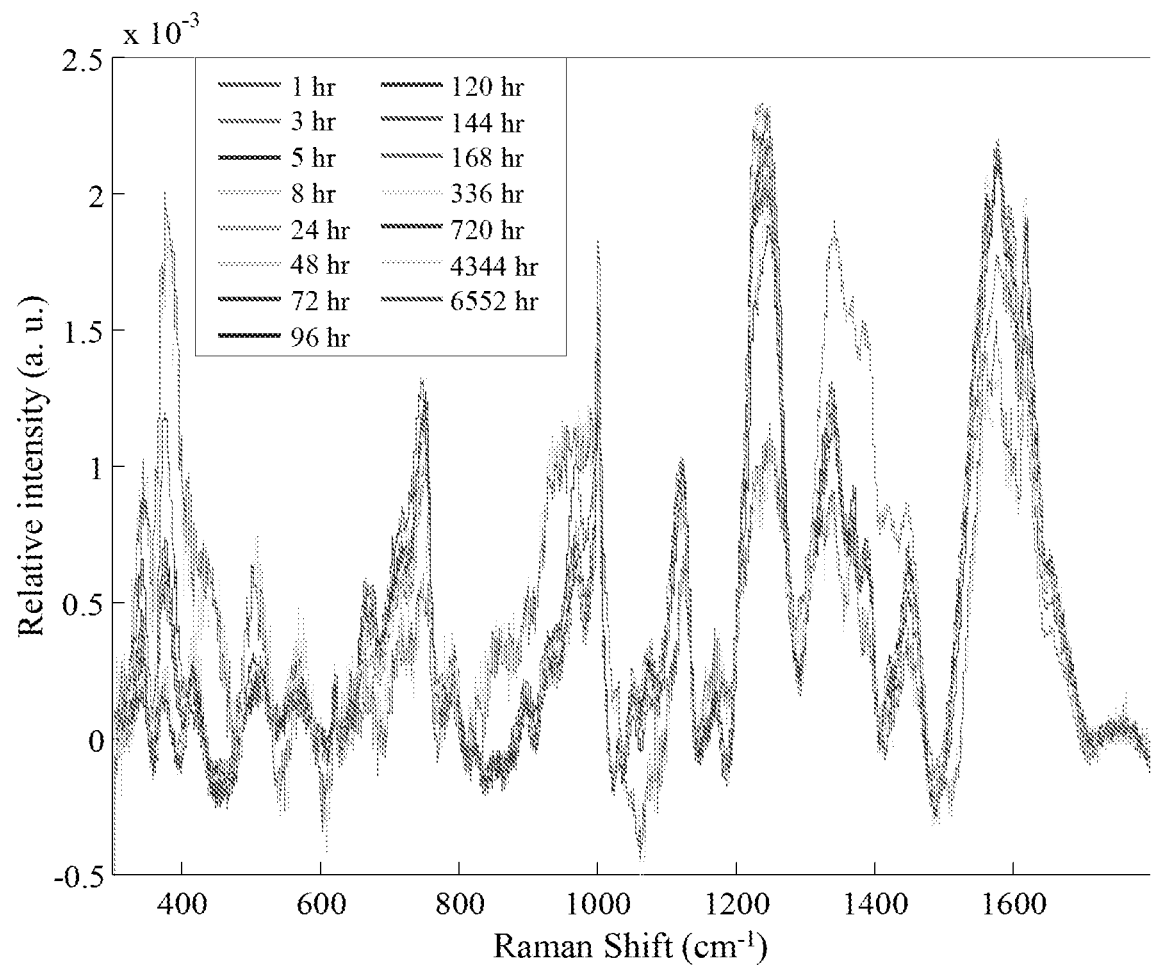
FIG. 14 is a graph showing the averaged preprocessed spectra for bloodstains stored in a cold (4° C.) temperature-controlled environment for up to 6552 hours (~9 months).

Raman maps, consisting of nine points each, were accumulated on freshly drawn human (male) blood, without preservatives or anti-coagulants, stored in cold temperature (4° C.) conditions at fifteen time points between 1-6552 hours (~9 months). FIG. 14 shows the preprocessed (baseline corrected and normalized) averaged spectra for all time points measured up to 6552 hours. It is clear that the spectra collected for the 3 hour time point are quite different from those collected at all other time points, particularly in the range of 1300-1450 cm$^{-1}$. As can be seen from FIG. 14, the largest spectral changes occur in the region 300-400 cm$^{-1}$. These changes are expected since the peaks in this region have been assigned to metHb, which is known to increase in relative abundance over time. For the final two time points, spectral differences also exist in the regions 800-950 cm$^{-1}$, 1200-1300 cm$^{-1}$, and 1550-1610 cm$^{-1}$. The peaks in the region 1200-1300 cm$^{-1}$ seemed to decrease with time, almost linearly. The peak intensities for the regions 800-950 cm$^{-1}$ and 1550-1610 cm$^{-1}$ were much higher and lower, respectively, relative to all earlier time points.

Figure 15:
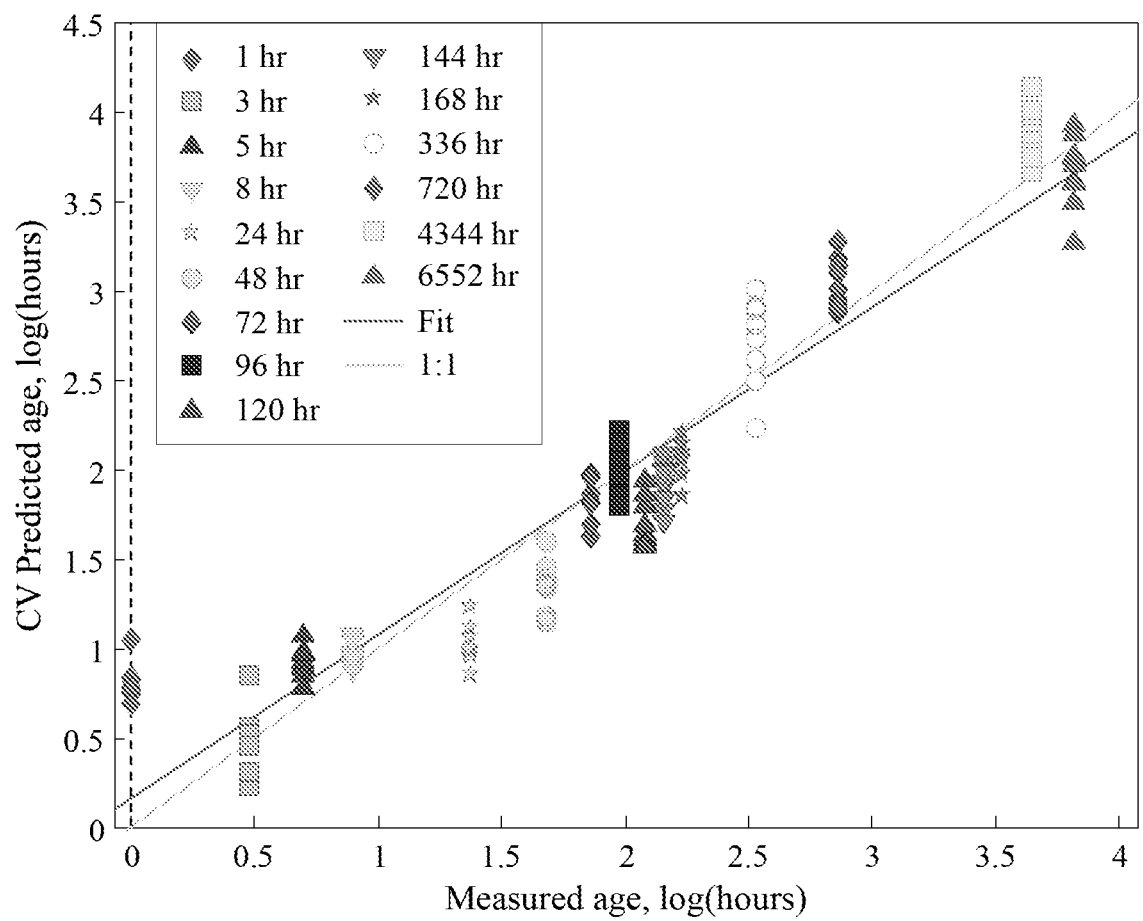
FIG. 15 is a graph showing the cross-validated (CV) age prediction values versus measured (actual) age values for the regression model built using spectra from bloodstains stored in a cold (4° C.) temperature-controlled environment for up to 6552 hours (~9 months).

In order to predict the age of the bloodstains stored in a cold (4° C.) temperature-controlled environment over time, a PLSR model was constructed using 4 LVs. FIG. 15 shows the CV results for predicting the age of the bloodstains stored at 4° C. for up to 6552 hours (~9 months). It could be assumed that since the spectra for the 3 hour old bloodstain did not follow the observed trend the PLSR model results may be affected, but that does not seem to be the case. The spectra for the 3 hour old bloodstain have an average amount of spread in their age predictions and all lie relatively close to the green (1:1 fit) and red (calculated fit) lines. The age predictions for the 4344 hours (~6 month) spectra were higher than most of those for the final (~9 month) time point. The same was observed for the 96 hour spectra. These inconsistencies most likely played a role in the higher RMSECV value of 0.33, as compared to results for other environments. However, the fit still seems to be quite good with a $R^2CV$ value of 0.90.

High Humidity (80%)

Figure 16:
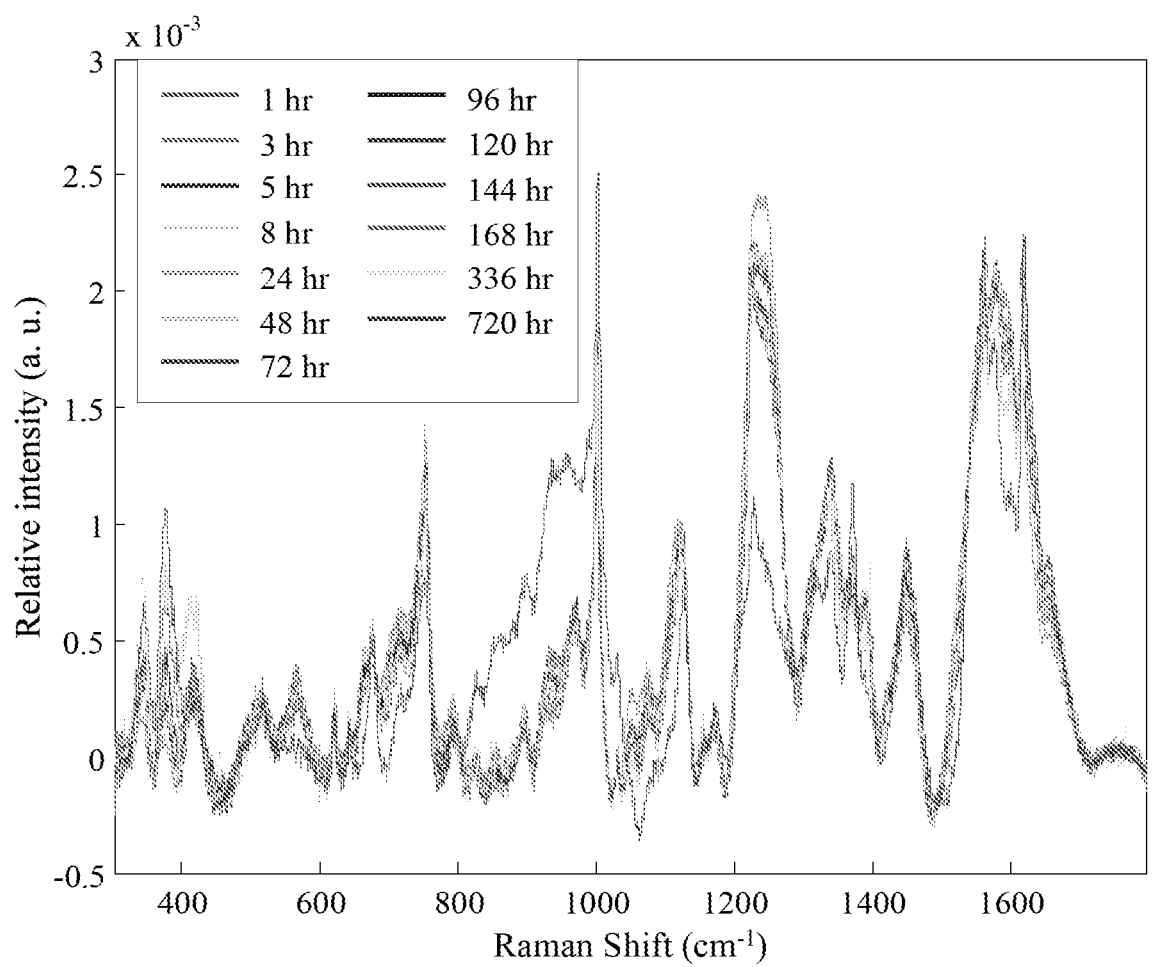
FIG. 16 is a graph showing the averaged preprocessed spectra for bloodstains stored in a high (80%) humidity environment for up to 720 hours (1 month).

Raman maps, consisting of nine points each, were accumulated on freshly drawn human (male) blood, without preservatives or anti-coagulants, stored in a high (80%) humidity environment at thirteen time points between 1-720 hours (1 month). The preprocessed (baseline corrected and normalized) averaged spectra for all time points are shown in FIG. 16. Unlike all other time points, the 8 hour time point does not follow the kinetic trend observed. The relative intensity for the spectral region 250-450 $cm^{-1}$ was much higher for the 8 hour spectra than all other time points. This is in contrast to what would be expected and is not in line with the trend occurring for the previous or later time points. Additionally, large differences can be seen in the spectral regions 800-950 $cm^{-1}$ and 1200-1300 $cm^{-1}$, which are much higher and lower in relative intensity, respectively, for the last time point (1 month), than for all earlier time points. It should be noted that after 1 month there was noticeable mold on all of the blood spots, which caused issues in obtaining spectra at later time points.

Figure 17:
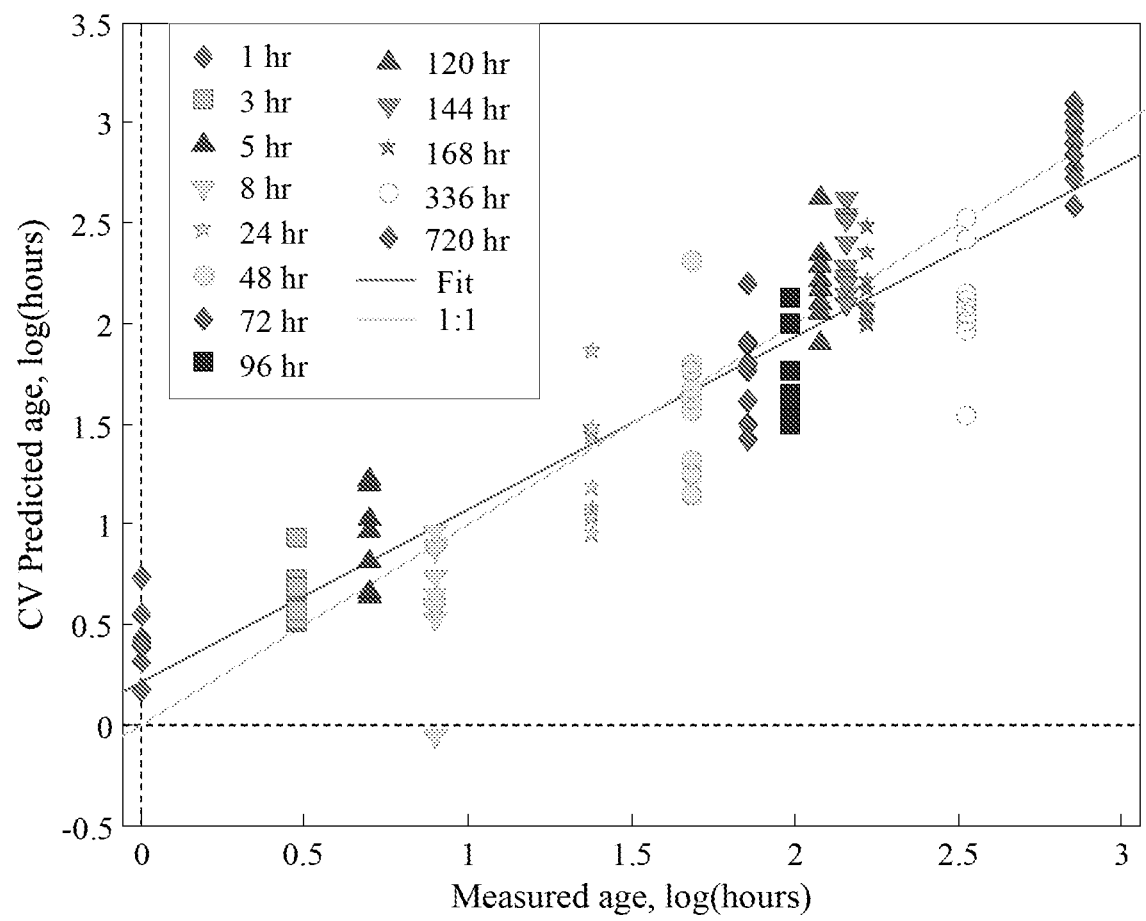
FIG. 17 is a graph showing the cross-validated (CV) age prediction values versus measured (actual) age values for the regression model built using spectra from bloodstains stored in a high humidity (80%) environment for up to 720 hours (1 month).

To predict the age of bloodstains stored in a high (80%) humidity environment, a PLSR model was constructed using 4 LVs. FIG. 17 shows the CV results for predicting the age of the bloodstains stored at HH for up to 720 hours (1 month). From this figure it is evident that almost all spectra from the 8 and 336 hour time points are lower than the 1:1 fit (green line). This is to be expected for the 8 hour time point, due to the variations observed in the spectra for this time point that do not seem to follow the common spectral trends (FIG. 16). However, the reasoning for the low age predictions for the 336 hour time point was not as clear.

Another observation is that the spread in age predictions for each time point seems to be larger than for any of the other environments bloodstains were stored in. The reason for this is most likely because the high humidity kept the bloodstains from staying dry and the natural processes that occur after a bloodstain dries were not applicable. Also, the fact that mold began to grow after the 1 month time point could easily have played a role in unnatural bloodstain aging. Therefore, the spectra within each time point were less similar to one another, providing inconsistencies when the model was constructed, which in turn affected the model's prediction accuracy. This is shown in the comparatively lower $R^2CV$ value of 0.85 and relatively high RMSECV value of 0.32.

The kinetic effects of bloodstain aging have been studied by Raman spectral analysis for up to one year at RT, 9 months for both increased (32° C.) and decreased (4° C.) temperatures, and one month at HH (80%). Similar spectral trends were observed for bloodstains stored at both RT and 32° C., which differed from those stored at 4° C. and in a HH environment. However, for all environments there seemed to be three regions (i.e. 300-400 $cm^{-1}$, 900-950 $cm^{-1}$, and 1200-1300 $cm^{-1}$) where the most prominent changes occurred over time. The CV PLSR prediction results varied between environments but the bloodstains kept at 32° C. showed the best results, followed closely by those stored at RT. The developed methodology of using Raman spectroscopy with regression analysis for determining the age of a bloodstain is practical and demonstrates good accuracy. The spectral changes over time for the four different environments helped to provide more information about the age of bloodstains. More importantly, these spectral changes allow for enough differentiation between newer and older bloodstains, regardless of the external environmental conditions bloodstains may have been exposed to.

Example 8—Determination of the Age of a Menstrual Blood Stain

A menstrual blood sample was ordered from Bioreclamation, LLC. In order to simulate fresh human blood as accurately as possible, specific instructions were given to freeze the sample immediately after collection, without adding any anticoagulants. Anticoagulants are a common additive in clinical blood samples, as they help to preserve the sample and prevent clotting. However, considering that these anticoagulants are not naturally found in blood, and therefore would not be present at a crime scene, they were omitted.

The sample was immediately stored in the freezer upon arrival until analysis. When the sample was removed from the freezer for analysis, the time was recorded and used as $t_0$ for the rest of the study. A total of 32 pre-labeled microscope slides were previously prepared, one for each of the scheduled time points, and 4 extra. The sample vial was vortexed to homogenize the blood, and then 10 µL was deposited onto an aluminum foil covered microscope slide, and stored in a specific environment. An ambient environment was set up in a chemical fume hood, with an average temperature of 25° C. and 50% humidity, and a humid environment was set up in a sealed chamber kept at 80% humidity and 25° C.

Spectra were collected at pre-determined time points, decreasing in frequency over time. Table 2 shows the time points in hours, days, and months used for this study. A Horiba LabRam HR Evolution Raman spectrometer with a 785 nm excitation source was used for data collection. Two 50 second exposures were acquired with a 50× long working distance objective over 300-1800 cm-1 at each mapping point. This acquisition procedure was repeated at nine points across the sample in order to collect a Raman spectroscopic map.

TABLE 2

Time Points Used in Menstrual Blood Kinetics Study.

| | Time Point | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Hours | 1 | 3 | 6 | 12 | 24 | 48 | 96 | 168 | 336 | 672 | 1344 | 2880 | 5808 | 8760 |
| Days | | | | | 1 | 2 | 4 | 7 | 14 | 28 | 56 | 123 | 242 | 365 |
| Months | | | | | | | | | | | | 4 | 8 | 12 |

Spectra were imported into MATLAB and assigned classes based on their age. Spectra were preprocessed (baseline corrected, smoothed, normalized by total area) and combined into one dataset per environment containing all of the spectra collected so far. These datasets were used to construct chemometric regression models to study the effects of time on the Raman spectra of menstrual blood with the PLS Toolbox.

Example 9—Results of Example 8

Ambient Environment

Figure 18:
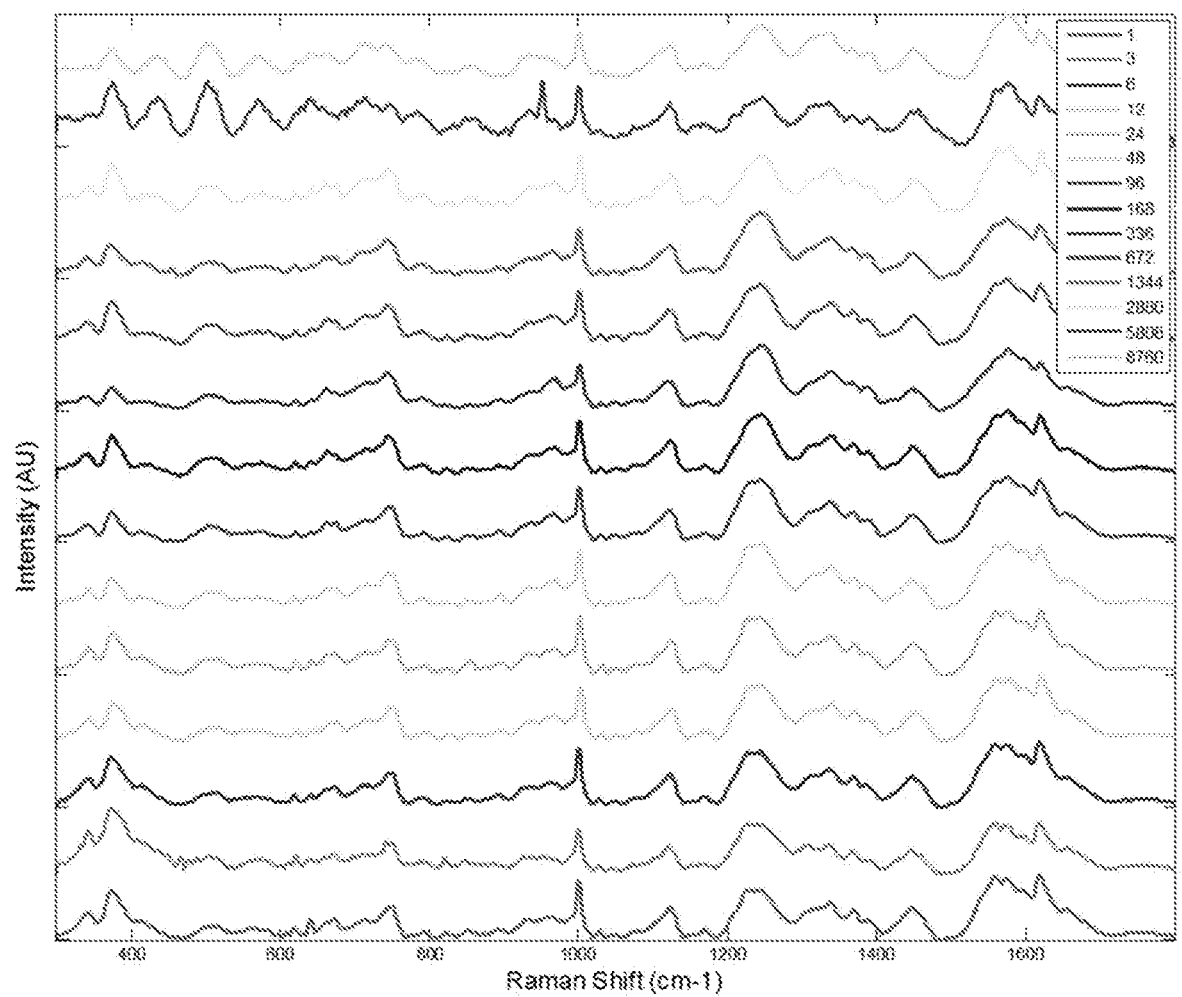
FIG. 18 is a graph showing mean preprocessed Raman spectra of menstrual blood collected over one year in an ambient environment. Legend shows sample age in hours.

FIG. 18 shows the mean spectra collected in the ambient environment at all 14 time points, after baseline correction, smoothing, and normalization. On average, the intensity of the peak at 1246 cm$^{-1}$, which is assigned to guanine, cytosine, and proteins (Movasaghi et al., "Raman Spectroscopy of Biological Tissues," Appl. Spectrosc. Rev. 42(5): 493-541 (2007), which is hereby incorporated by reference in its entirety), increased over time. This particular dataset contained markedly unusual spectra, which differed from the rest of the time points studied. The spectra were statistically considered outliers based on PCA testing.

Figure 19:
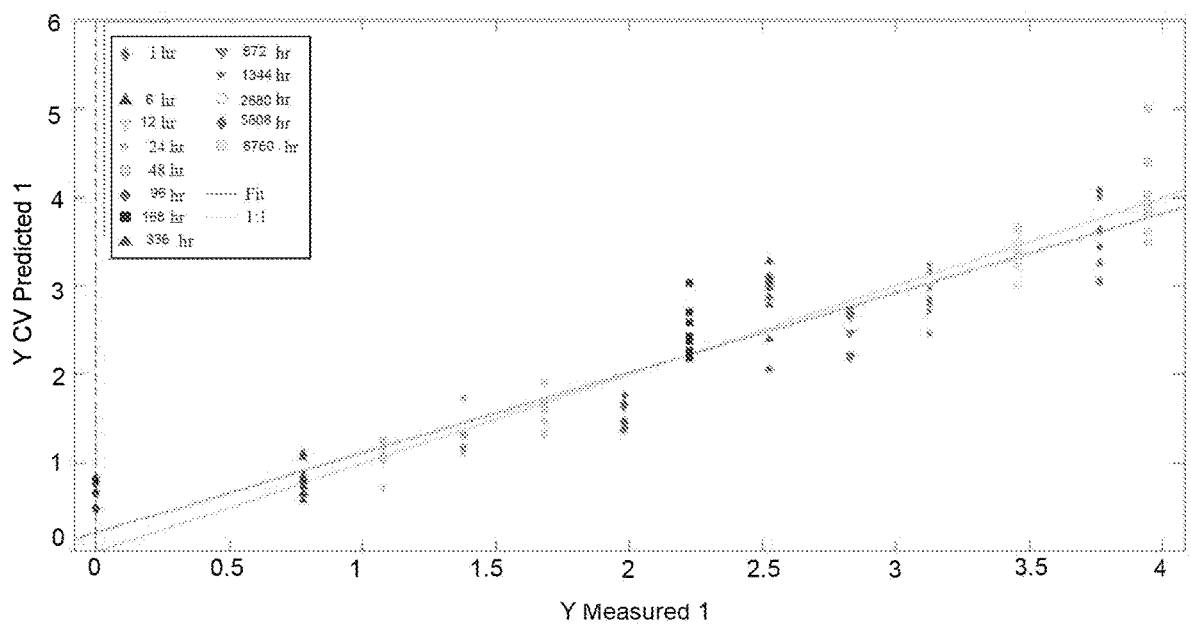
FIG. 19 is a graph showing cross-validated predictions from the PLSR model built with menstrual blood spectra from the ambient environment. The green trace shows the ideal regression line for the model, while the red trace shows the actual line of best fit. Each symbol represents a single Raman spectrum.

The spectra shown in FIG. 18, excluding those collected at 3 hours, were used to build a PLSR model. Four LVs were used, as well as Venetian blinds cross-validation. The cross-validated prediction results for the model are show in FIG. 19. Each symbol on the plot represents a single Raman spectrum. The symbols are plotted on the x-axis according to the actual time point they were collected at, and the y-axis plots the model's cross-validated prediction for each spectrum. Ideally, the spectra would all fall on the y=x line (green trace in FIG. 19). Instead, the line of best fit for the model deviates from this slightly (red trace in FIG. 19). The $R^2CV$ for the PLSR model is 0.89, and the RMSECV is 0.38.

Humid Environment

After 4 days, some of the sample slides stored in the humidity chamber exhibited a fibrous gray-green covering, which appeared to be mold or mildew. Data was still collected at the 4 and 7 day time points. However, at two weeks all of the samples were completely covered in the mold-looking substance.

Figure 20:
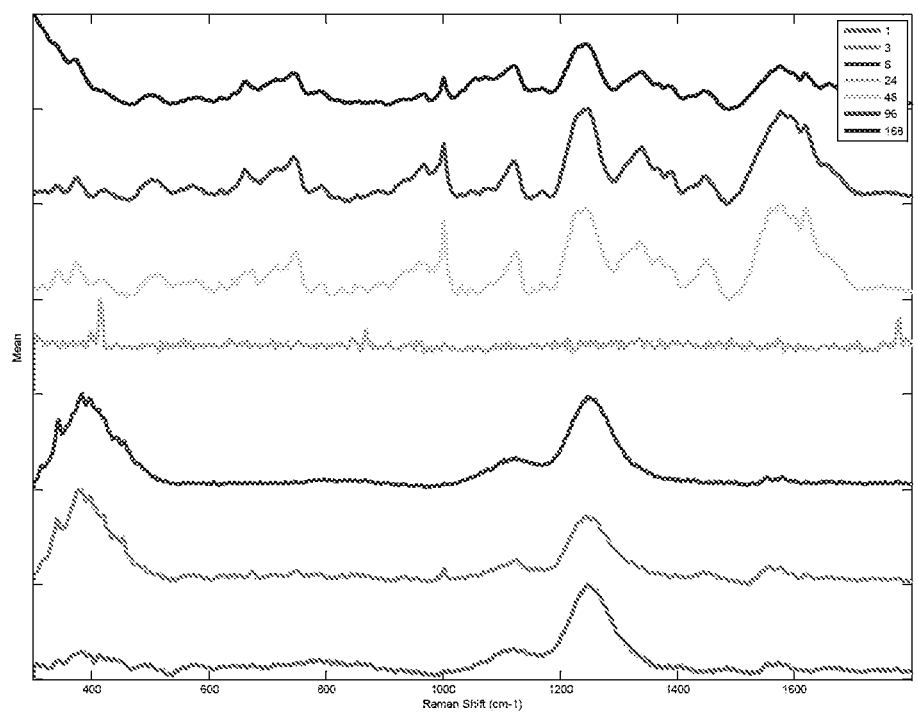
FIG. 20 is a graph showing mean preprocessed Raman spectra of menstrual blood collected over two weeks in a humid environment. Legend shows sample age in hours.

FIG. 20 shows the mean spectra collected in a humid environment from the first seven time points, after baseline correction, smoothing, and normalization. Spectra were not collected at 12 hours. The spectra collected from the first six hours look considerably different from the corresponding spectra collected in the ambient environment. Because of the increased humidity, it is possible that the samples were still moist upon analysis, which could affect the spectra. Additionally, the mean spectrum from 24 hours is especially void of spectral features.

Figure 21:
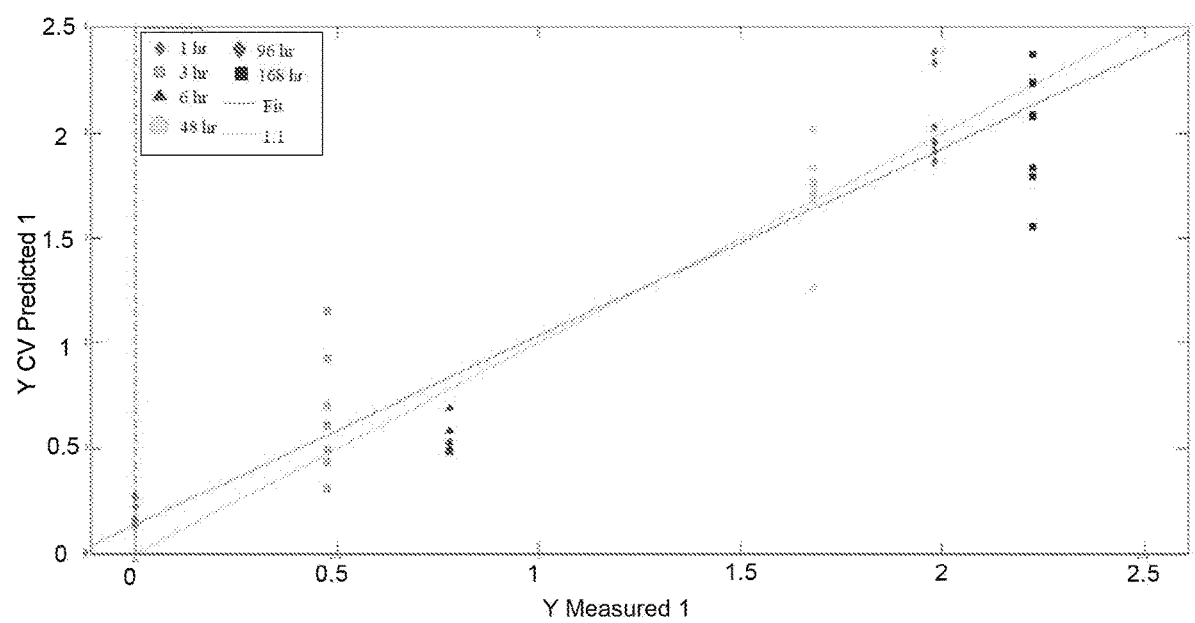
FIG. 21 is a graph showing cross-validated predictions from the PLSR model built with menstrual blood spectra from the high humidity environment. The green trace shows the ideal regression line for the model, while the red trace shows the actual line of best fit. Each symbol represents a single Raman spectrum.

The spectra shown in FIG. 20, excluding those collected at 24 hours, were used for regression analysis. A second PLSR model was constructed using 4 LVs and Venetian blinds cross-validation. The cross-validated predictions from this model are shown in FIG. 21. The line of best fit is slightly closer to the ideal 1:1 line, suggesting a stronger linear correlation in the spectra collected from the high humidity environment than the ambient environment. The $R^2CV$ for this PLSR model is 0.90, and the RMSECV is 0.25.

Example 10—Determination of the Age of a Saliva Stain

Raman spectroscopy was used for monitoring the changes from degradation in saliva over time. During this kinetic experiment, these biochemical changes were analyzed for eight months. The obtained results showed a great potential of Raman spectroscopy for determining the age of the saliva stain.

Figure 22:
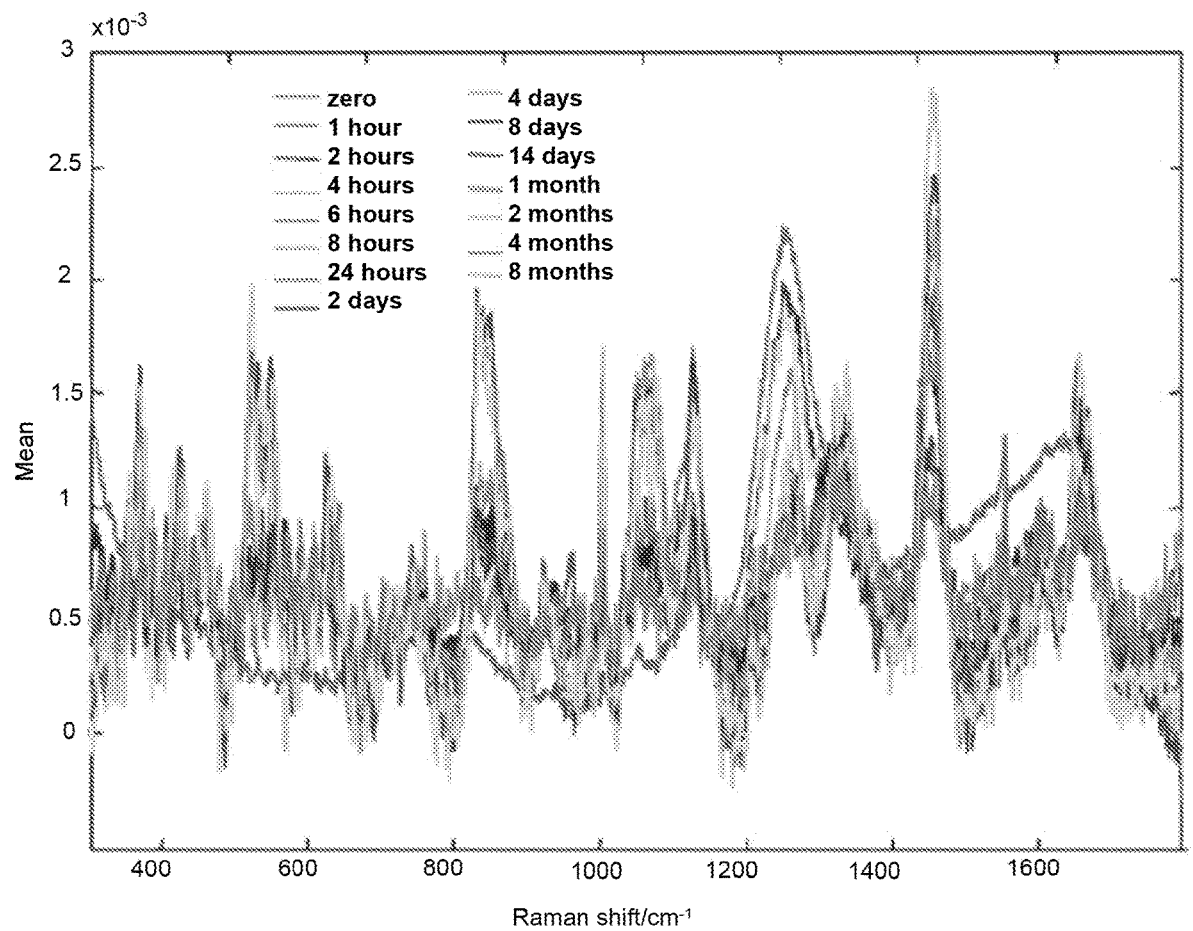
FIG. 22 is a graph showing Raman spectra of saliva. Different colors of spectra correspond to different time points from 0 minutes to 8 month.

Saliva samples were prepared by putting a 10 µL drop on a microscopic slide, covered with aluminum foil, which reduces the fluorescence interference from glass. The following time intervals were used for this particular objective: 0 hours; 1 hour; 2 hour; 4 hours; 6 hours; 8 hours; 24 hours; 2 days; 4 days; 8 days; 14 days; 1 month; 2 months; 4 months; 8 months. Automatic mapping was performed on an area about 5×5 mm with 785 nm excitation of laser light. FIG. 22 illustrates averaged Raman spectra of saliva from the $t_0$ time point to eight months. Visual inspection of the spectroscopic changes during eight months indicated that the overall shape of the spectra, as well as positions of the bands, remain similar after one hour of body fluid degradation.

Figure 23:
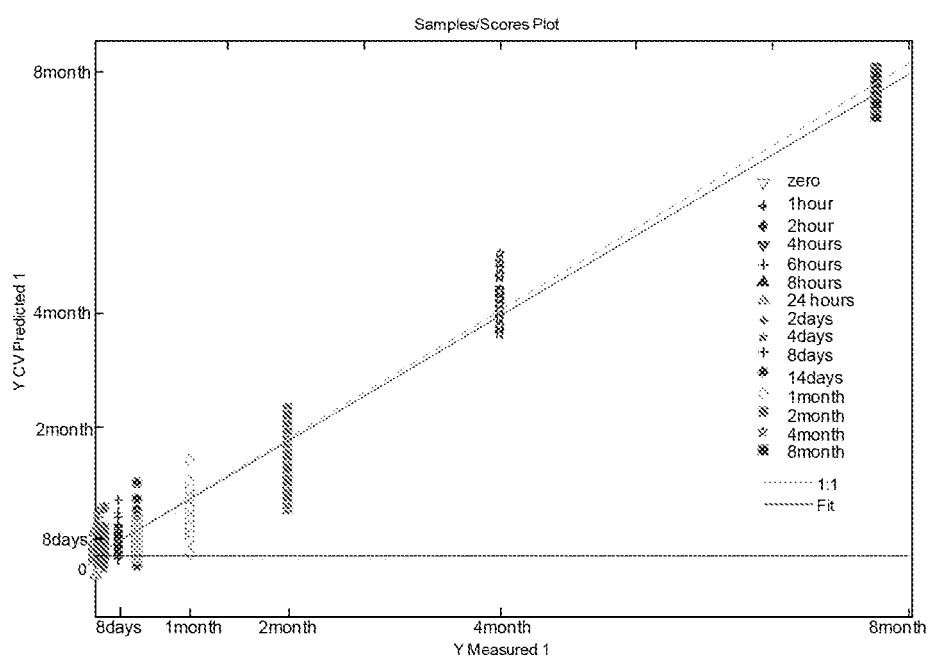
FIG. 23 is a graph showing regression analysis of the saliva aging process. Different symbols represent spectra for time points from 0 minutes to 8 months.

Statistical analysis was performed in MATLAB 7.4.0 software after spectral preprocessing in GRAMS/AI 7.01. The aging kinetics were studied by advanced classification methods (PLS-DA, LDA, MANOVA, SVM, ANN, etc.) with various clustering, including Mahalanobis distances-based methods, PCA, NLM, etc. In order to remove meaningless variables, feature selection methods such as t-test and P-test filters, and wrappers were used to estimate the relative importance of the independent variables in classifying the dependent variable (time). The regression model was build and cross validated as shown in FIG. 23. As evident from these results, the regression model can be used to estimate the stain's age.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A method of determining an age of a body fluid stain in a sample, said method comprising:
   providing the sample containing a body fluid stain,
   providing a statistical model for determination of the age of the body fluid stain in the sample, the statistical model based on spectroscopic signatures for a plurality modeling samples,
   wherein each of the plurality of modeling samples includes a similar body fluid stain as the body fluid stain in the sample and a predetermined age of each of the body fluid stains in each modeling sample, and
   wherein the spectroscopic signatures for each of the plurality of modeling samples are associated with the predetermined age of the modeling sample;
   subjecting the sample or an area of the sample containing the stain to a spectroscopic analysis to produce a spectroscopic signature for the sample; and
   applying the spectroscopic signature for the sample to the statistical model to ascertain the age of the body fluid stain in the sample.

2. The method of claim 1, wherein the body fluid is selected from the group consisting of blood, saliva, sweat, urine, semen, and vaginal fluid.

3. The method of claim 1, wherein the spectroscopic analysis is a Raman spectroscopy selected from the group consisting of resonance Raman spectroscopy, normal Raman spectroscopy, Raman microscopy, Raman microspectroscopy, NIR Raman spectroscopy, surface enhanced Raman spectroscopy (SERS), tip enhanced Raman spectroscopy (TERS), Coherent anti-Stokes Raman scattering (CARS), and Coherent anti-Stokes Raman scattering microscopy.

4. The method of claim 1 further comprising: subjecting the spectra to a two-dimensional correlation spectroscopy (2D CoS).

5. The method of claim 1, wherein statistical model is a regression model.

6. The method of claim 5, wherein the statistical model is prepared by Artificial neural network (ANN), Classical least squares (CLS), Locally weighted regression (LWR), Multiple linear regression (MLR), Designated experimental MLR, Multiway partial least squares (NPLS), Principle component regression (PCR), Partial least squares (PLS), or Support vector machine.

7. The method of claim 1, wherein the statistical model for determination of the age of a stain in the sample is prepared by Partial least squares discriminant analysis (PLS-DA), Linear discriminant analysis (LDA), Multivariate analysis of variance (MANOVA), Support vector machine (SVM), or Artificial neural network (ANN).

8. The method of claim 7 further comprising: using a clustering method for the preparation of the statistical model.

9. A method of establishing a statistical model for determination of an age of a body fluid stain in a sample, said method comprising:
providing a plurality of modeling samples, each of the plurality of modeling samples containing a known type and a predetermined age of a modeling body fluid stain;
subjecting each modeling sample or an area of each modeling sample containing the modeling body fluid stain to a spectroscopic analysis to produce a spectroscopic signature for each modeling sample, the spectroscopic signature for each modeling sample associated with the predetermined age of the body fluid stain; and
establishing a statistical model for determination of the age of the body fluid stain in the sample based on said subjecting.

10. The method of claim 9, wherein a body fluid forming the body fluid stain is selected from the group consisting of blood, saliva, sweat, urine, semen, and vaginal fluid.

11. The method of claim 9 further comprising: subjecting the spectra to a two-dimensional correlation spectroscopy (2D CoS).

12. The method of claim 9, wherein the statistical model for determination of the age of the body fluid stain in the sample is for a specific type of stain.

13. The method of claim 9, wherein the statistical model for determination of the age of the body fluid stain in the sample is prepared by regression analysis.

14. The method of claim 13, wherein the statistical model is prepared by Artificial neural network (ANN), Classical least squares (CLS), Locally weighted regression (LWR), Multiple linear regression (MLR), Designated experimental MLR, Multiway partial least squares (NPLS), Principle component regression (PCR), Partial least squares (PLS), or Support vector machine.

15. The method of claim 9, wherein the statistical model for determination of the age of the body fluid stain in the sample is prepared by Partial least squares discriminant analysis (PLS-DA), Linear discriminant analysis (LDA), Multivariate analysis of variance (MANOVA), Support vector machine (SVM), or Artificial neural network (ANN).

16. The method of claim 15 further comprising: using a clustering method for the preparation of the statistical model.

17. The method of claim 9 further comprising validating the statistical model.

18. The method of claim 9, wherein spectroscopic analysis is Raman spectroscopy.

19. The method of claim 18, wherein the Raman spectroscopy is selected from the group consisting of resonance Raman spectroscopy, normal Raman spectroscopy, Raman microscopy, Raman microspectroscopy, NIR Raman spectroscopy, surface enhanced Raman spectroscopy (SERS), tip enhanced Raman spectroscopy (TERS), Coherent anti-Stokes Raman scattering (CARS), and Coherent anti-Stokes Raman scattering microscopy.

20. The method of claim 9, wherein the predetermined age of the modeling body fluid stain included in each of the plurality of modeling samples is selected from the group consisting of one (1) hour, three (3) hours, five (5) hours, eight (8) hours, 24 hours, 48 hours, 72 hours, 96 hours, 120 hours, and 168 hours.

* * * * *